US012750347B1

(12) United States Patent
Nyberg et al.

(10) Patent No.: US 12,750,347 B1
(45) Date of Patent: Sep. 29, 2026

(54) SYSTEM AND METHOD OF USE OF WIREGUARD TUNNELING PROTOCOL

(71) Applicant: TELOS CORPORATION, Ashburn, VA (US)

(72) Inventors: Karl A. Nyberg, Ashburn, VA (US); David R. Ryan, Reston, VA (US); Thomas Badders, Ashburn, VA (US)

(73) Assignee: TELOS CORPORATION, Ashburn, VA (US)

( * ) Notice: Subject to any disclaimer, the term of this patent is extended or adjusted under 35 U.S.C. 154(b) by 35 days.

(21) Appl. No.: 18/770,117

(22) Filed: Jul. 11, 2024

Related U.S. Application Data

(60) Provisional application No. 63/526,171, filed on Jul. 11, 2023.

(51) Int. Cl.
*H04L 9/40* (2022.01)
*H04L 12/46* (2006.01)

(52) U.S. Cl.
CPC ...... *H04L 63/0414* (2013.01); *H04L 12/4633* (2013.01)

(58) Field of Classification Search
CPC ........................ H04L 63/0414; H04L 12/4633
See application file for complete search history.

(56) References Cited

U.S. PATENT DOCUMENTS

| | | | | |
|---|---|---|---|---|
| 6,266,704 | B1 | 7/2001 | Reed et al. | |
| 7,590,245 | B1 * | 9/2009 | Levitan | H04L 63/0414 713/160 |
| 8,832,311 | B1 | 9/2014 | Reynolds et al. | |
| 8,904,036 | B1 | 12/2014 | Reynolds et al. | |
| 9,130,911 | B2 | 9/2015 | Reynolds et al. | |
| 10,225,289 | B1 * | 3/2019 | Tucker, IV | H04W 4/30 |
| 2023/0370425 | A1 * | 11/2023 | Vandenbussche | H04L 45/745 |
| 2024/0364515 | A1 * | 10/2024 | Haddad | H04L 9/30 |

OTHER PUBLICATIONS

David M. Goldschlag et al., "Hiding Routing Information", Workshop on Information Hiding, Cambridge, UK, May 1996, pp. 1-14.

(Continued)

*Primary Examiner* — Mohamed A. Wasel
(74) *Attorney, Agent, or Firm* — MILES & STOCKBRIDGE P.C.; David R. Schaffer

(57) ABSTRACT

A system that improves upon the existing Tor protocol by (1) simplifying the network creation with a reduction in the number of different components, (2) reducing the time for a network to become operational, (3) allowing for a microservices architecture that supports dynamic scalability, and (4) reducing the latency and increasing the throughput of the resulting network. A simplified nested wireguard tunnelling network creation and reduced operational deployment time reduces the cost to deploy and maintain the network. The use in a microservices architecture further allows dynamic scalability of the network, permitting more cost-effective deployments in environments that have dynamic use patterns, for example, traditional educational and business environments with primary "nine to five" hours of operation).

21 Claims, 12 Drawing Sheets

(56) References Cited

OTHER PUBLICATIONS

Roger Dingledine et al., "Tor: The Second-Generation Onion Router", USENIX Association, Proceedings of the 13th USENIX Security Symposium, San Diego, CA, USA, Aug. 9-13, 2004, 18 pages.
Wikipedia, "Onion Routing", https://en.wikipedia.org/wiki/Onion_routing, last downloaded Oct. 7, 2024, 5 pages.
Jason A. Donenfeld, "WireGuard: Next Generation Kernel Network Tunnel", https://www.wireguard.com/papers/wireguard.pdf, Jun. 1, 2020, pp. 1-20.
Jason A. Donenfeld, "WireGuard: fast, modern, secure VPN tunnel", https://www.wireguard.com, last downloaded Oct. 9, 2024.
SSH Academy, "What is SSH Public Key Authentication", https://www.ssh.com/academy/ssh/public-key-authentication, last downloaded Oct. 9, 2024.
Jason A. Donenfeld, "Protocol & Cryptography—WireGuard", https://www.wireguard.com/protocol/, 9 pages, last downloaded Oct. 9, 2024.
Bobcares, "Iptables udp port forwarding—Easy way to do it!", https://bobcares.com/blog/iptables-udp-port-forwarding/, 9 pages, last downloaded Oct. 9, 2024.
Albert L. Donaldson et al., "Covert Channels in Trusted LANs", The 11th NBS / NCSC National Computer Security Conference, pp. 226-232. Oct. 17-20, 1988, Baltimore, MD.
Roger Dingledine, "Adaptive throttling of Tor clients by entry guards", Tor Tech Report 2010-09-001, The Tor Project, Sep. 19, 2010, pp. 1-5.
Roger Dingledine, "Better guard rotation parameters", Tor Tech Report 2011-08-001, The Tor Project, Aug. 20, 2011, pp. 1-3.
Roger Dingledine et al., "Design of a blocking-resistant anonymity system", Tor Tech Report 2006-11-001, The Tor Project, Nov. 2006, pp. 1-25.
Karsten Loesing, "Case study: Learning whether a Tor bridge is blocked by looking at its aggregate usage statistics, Part One", Tor Tech Report 2011-09-002, The Tor Project, Sep. 15, 2011, pp. 1-6.
Nicholas Hopper, "Protecting Tor from botnet abuse in the long term", Tor Tech Report 2013-11-001, The Tor Project, Nov. 20, 2013, pp. 1-14.
Karsten Loesing, "What fraction of our bridges are not reporting usage statistics?", Tor Tech Report 2012-04-001, The Tor Project, Apr. 30, 2012, pp. 1-6.
Karsten Loesing, "What if the Tor network had 50,000 bridges?", Tor Tech Report 2012-03-001, The Tor Project, Mar. 9, 2012, pp. 1-3.
Karsten Loesing, "An Analysis of Tor Bridge Stability—Making BridgeDB give out at least one stable bridge per user", Tor Tech Report 2011-10-001, The Tor Project, Oct. 31, 2011, pp. 1-9.
Karsten Loesing, "Analysis of Circuit Queues in Tor", Tor Tech Report 2009-08-001, The Tor Project, Aug. 25, 2009, pp. 1-6.
Philipp Winter, "Design Requirements for a Tor Censorship Analysis Tool", Tor Tech Report 2013-02-001, The Tor Project, Feb. 6, 2013, pp. 1-5.
Roger Dingledine et al., "Challenges in deploying low-latency anonymity", Tor Tech Report 2005-02-001, The Tor Project, Feb. 2005, pp. 1-22.
Karsten Loesing, "Reducing the Circuit Window Size in Tor", Tor Tech Report 2009-09-002, The Tor Project, Sep. 20, 2009, pp. 1-5.
Karsten Loesing, "Counting daily bridge users", Tor Tech Report 2012-10-001, The Tor Project, Oct. 24, 2012, pp. 1-13.
Sebastian Hahn et al., "Privacy-preserving Ways to Estimate the Number of Tor Users", Tor Tech Report 2010-11-001, The Tor Project, Nov. 30, 2010, pp. 1-15.
Karsten Loesing, "Overview of Statistical Data in the Tor Network", Tor Tech Report 2011-03-001, The Tor Project, Mar. 14, 2011, pp. 1-13.
Steven J. Murdoch, "Comparison of Tor Datagram Designs", Tor Tech Report 2011-11-001, The Tor Project, Nov. 7, 2011, pp. 1-15.
Steven J. Murdoch, "Datagram Testing Plan", Tor Tech Report 2012-03-002, The Tor Project, Mar. 16, 2012, pp. 1-3.
George Danezis, "An anomaly-based censorship-detection system for Tor", Tor Tech Report 2011-09-001, The Tor Project, Sep. 9, 2011, pp. 1-3.
Sebastian Hahn, "Different Ways to Use a Bridge", Tor Tech Report 2011-11-002, The Tor Project, Nov. 29, 2011, pp. 1-4.
Karsten Loesing, "Measuring the Tor Network, Evaluation of Relays from Public Directory Data", Tor Tech Report 2009-06-001, The Tor Project, Jun. 22, 2009, pp. 1-8.
Karsten Loesing, "Measuring the Tor network, Evaluation of Client Requests to the Directories", Tor Tech Report 2009-06-002, The Tor Project, Jun. 25, 2009, pp. 1-11.
Antonela Debiasi et al., "Addressing Denial of Service Attacks on Free and Open Communication on the Internet: Interim Report 1", Tor Tech Report 2018-11-001, The Tor Project, Nov. 19, 2018, pp. 1-55.
Cecylia Bocovich et al., "Addressing Denial of Service Attacks on Free and Open Communication on the Internet: Final report", Tor Tech Report 2019-05-001, The Tor Project, May 31, 2019, pp. 1-33.
Nick Mathewson, "Denial-of-service attacks in Tor: Taxonomy and defenses", Tor Tech Report 2015-10-001, The Tor Project, Oct. 29, 2015, pp. 1-9.
George Kadianakis et al., "Extrapolating network totals from hidden-service statistics", Tor Tech Report 2015-01-001, The Tor Project, Jan. 31, 2015, pp. 1-10.
Roger Dingledine, "Five ways to test bridge reachability", Tor Tech Report 2011-12-001, The Tor Project, Dec. 1, 2011, pp. 1-6.
Karsten Loesing, "Comparison of GeoIP Databases for Tor", Tor Tech Report 2009-10-001, The Tor Project, Oct. 23, 2009, pp. 1-6.
David Goulet et al., "Hidden-service statistics reported by relays", Tor Tech Report 2015-04-001, The Tor Project, Apr. 28, 2015, pp. 1-13.
Babatunde Okunoye, "Censored Continent: Understanding the use of tools during Internet censorship in Africa: Cameroon, Nigeria, Uganda and Zimbabwe as case studies." Technical Report 2020-07-001, OTF, The Tor Project, Jul. 31, 2020, 31 pages.
Karsten Loesing et al., "Evaluation of a libutp-based Tor Datagram Implementation", Tor Tech Report 2013-10-001, The Tor Project, Oct. 30, 2013, pp. 1-11.
Roger Dingledine, "Measuring the safety of the Tor network", Tor Tech Report 2011-02-001, The Tor Project, Feb. 6, 2011, pp. 1-5.
Karsten Loesing, "Measuring the Tor Network from Public Directory Information", Tor Tech Report 2009-08-002, The Tor Project, Aug. 7, 2009, pp. 1-12.
Iain R. Learmonth et al., "Tor Metrics Data Collection, Aggregation, and Presentation", Tor Tech Report 2019-03-001, The Tor Project, Mar. 25, 2019, pp. 1-25.
Iain R. Learmonth et al., "Towards Modernising Data Collection and Archive for the Tor Network", Tor Tech Report 2018-12-001, The Tor Project, Dec. 19, 2018, pp. 1-26.
George Kadianakis, Packet Size Pluggable Transport and Traffic Morphing, Tor Tech Report 2012-03-004, The Tor Project, Mar. 13, 2012, pp. 1-7.
Roger Dingledine, "Overhead from directory info: past, present, future", Tor Tech Report 2009-02-001, The Tor Project, Feb. 16, 2009, pp. 1-3.
Roger Dingledine et al., "Performance Improvements on Tor or, Why Tor is slow and what we're going to do about it", Tor Tech Report 2009-11-001, The Tor Project, Nov. 9, 2009, pp. 1-29.
Steven J. Murdoch et al., "Pluggable Transports Roadmap", Tor Tech Report 2012-03-003, The Tor Project, Mar. 17, 2012, pp. 1-6.
Karin Herm, "Privacy analysis of Tor's in-memory statistics", Tor Tech Report 2017-04-001, The Tor Project, Apr. 2017, pp. 1-26.
Karsten Loesing, "An analysis of Tor Relay Stability", Tor Tech Report 2011-06-001, The Tor Project, Jun. 30, 2011, pp. 1-12.
Nick Mathewson et al., "Towards Side Channel Analysis of Datagram Tor vs Current Tor", Tor Tech Report 2018-11-002, The Tor Project, Nov. 27, 2018, pp. 1-9.
Roger Dingledine, "Strategies for getting more bridge addresses", Tor Tech Report 2011-05-001, The Tor Project, May 13, 2011, pp. 1-3.
Runa A. Sandvik, "Forensic Analysis of the Tor Browser Bundle on OS X, Linux, and Windows", Tor Tech Report 2013-06-001, The Tor Project, Jun. 28, 2013, pp. 1-13.

(56) References Cited

OTHER PUBLICATIONS

Roger Dingledine, "Ten ways to discover Tor bridges", Tor Tech Report 2011-10-002, The Tor Project, Oct. 31, 2011, pp. 1-7.
Mike Perry, "TorFlow: Tor Network Analysis", Tor Tech Report 2009-08-003, The Tor Project, Aug. 7, 2009, pp. 1-18.
Virgil Griffith, "Tor growth rates and improving Torperf throughput", Tor Tech Report 2014-10-001, The Tor Project, Oct. 4, 2014, pp. 1-11.
Jacob Appelbaum, "Tor and NAT devices: increasing bridge & relay reachability or, enabling the use of NAT-PMP and UPnP by default", Tor Tech Report 2012-08-001, The Tor Project, Aug. 22, 2012, pp. 1-5.
Karsten Loesing et al., "Requirements and Software Design for a Better Tor Performance Measurement Tool", Tor Tech Report 2013-10-002, The Tor Project, Oct. 30, 2013, pp. 1-11.
Karsten Loesing. "Performance of Requests over the Tor Network", Tor Tech Report 2009-09-001, The Tor Project, Sep. 22, 2009, pp. 1-7.
Karsten Loesing et al., "Virtual Private Services", Tor Tech Report 2008-07-001, The Tor Project, Jul. 25, 2008, pp. 1-13.
Karsten Loesing, "Measuring the Tor Network—Evaluation of Bridges and Their Usage in Tor", Tor Tech Report 2009-06-003, The Tor Project, Jun. 22, 2009, pp. 1-3.
Sebastian Hahn et al., "Measuring the Tor Network—Alternative Requirements for Relay Flags", Tor Tech Report 2009-04-001, The Tor Project, Apr. 11, 2009, pp. 1-6.

* cited by examiner

SYSTEM AND METHOD OF USE OF WIREGUARD TUNNELING PROTOCOL

CROSS-REFERENCE TO RELATED APPLICATIONS

This application claims priority to U.S. Provisional Patent Application Ser. No. 63/526,171, filed on Jul. 11, 2023, the disclosure of which is incorporated herein by reference in its entirety.

TECHNICAL FIELD

The presently disclosed subject matter relates to online location protection, and, more particularly, to provide efficient and rapid deployment of a system and method for location obfuscation of network traffic.

BACKGROUND

The original Onion Routing (Tor) protocol causes data from a client device 104 to be transported across a circuit 110 within the Tor network 100 to a target or recipient, here a server 105, as seen in FIG. 1 (source: https://www.massmux.com/how-tor-really-works-for-protecting-identity/). Tor© is a registered trademark of The Tor Project, Inc. of Winchester, New Hampshire. The Tor service is a volunteer-run service that uses physical nodes with physical IP addresses and that is available to anyone that wants to use it. When new nodes are added to the network, they undergo a probationary period before they are permitted to pass "production" traffic. An access node or a guardian node 101 requests a Tor circuit (which usually consists of several transit nodes 102, for example, two, and an exit node 103) from one of several consensus-voting directory authority nodes (where transit nodes 102 and exit nodes 103 announce their availability for use in such circuits). In the Tor network, exit nodes and IP addresses of the nodes are public and searchable and only exits to the public internet. The time for processing of announcements and consensus voting and determination of sufficient capacity of such nodes for network operation can take up to thirty minutes for a network to coalesce for a new instance of a private Tor network.

When the circuit 110 has been obtained, the guardian or access node 101 uses the information associated with each node in the circuit 110 to successively encrypt the original data or message 120 (which can be either unencrypted or "end-to-end" encrypted with a destination's public encryption key, for example) with the public key of each node K1, K2, K3 along with the Internet Protocol (IP) address of the following node. As shown in diagram 200 in FIG. 2, as data 201 in an onion 210 transits through the circuit, each individual node decrypts the data (using its own private key) to determine an IP address 214, 215 of the following node and forwards the remaining data. A more accurate description of the underlying data 201 in FIG. 2 used in the transmission shows an "onion" 210 consisting of the data 201 wrapped in multiple layers of encryption that are then removed in turn by each node in the circuit (source: http://wiki.cas.mcmaster.ca/index.php/File:Onion.png). As seen in FIG. 2, the onion 210 that is sent from the client device 104 to a first router or node in the circuit, which then decrypts an outer E[4u] encryption layer 211 of the onion 210 using its private key, to expose an IP address 214 for a second router, to which the first router then sends a remaining onion 210' and the second router decrypts an outer E[3u] encryption layer 212 using its private key, to expose an IP address 215 for a third router, to which the second router then sends a further remaining onion 210" and the third router decrypts an outer E[5u] encryption layer 213 using its private key, to expose the data 201, which is then sent by the third router to a target, for example, but not limited to, a server 105, or a second end user (not shown). As used herein "router" and "node" can be used synonymously and interchangeably.

More specifically, not only is the data multiply encrypted, but the IP addresses of the ensuing nodes are as well, as shown in FIG. 2. The Tor protocol ensures that the intermediate nodes 102, i.e., transit nodes 102, only know the preceding node (because it was the source of the data) and the immediately following node (to which it forwards the "reduced" onion) IP addresses during the data transmission.

As illustrated in FIG. 3A, the Tor protocol ensures that individual nodes within a Tor network 300 with multiple transit nodes know only the IP address of the previous and following nodes in the transit of the data across the multiple transit node. In the Tor network 300, the encryption and decryption occur at an application layer 305 of the network, which requires the data to move up and down the network stack starting with a user 350 sending the data at the application layer 305, down to a presentation layer 310, down to a session layer 315, down to a transport layer 320, down to a network layer 325, down to a data link layer 330, and down to a physical layer 335 and back up in reverse order at the access node 355 in the Tor network 300 with multiple transit nodes. This network stack traversal is repeated from the access node 355 to a first transit node 360 to a second transit node 365 to an exit node 370 and finally to a target 375, thus adding latency to the overall transfer of data across the Tor network 300 with multiple transit nodes.

The TELOS GHOST® secure network access system, provided by Telos Corporation of Ashburn, Virginia, currently employs the original onion routing, Tor, protocol to provide a cloud-based virtual location obfuscation network as-a-service for network traffic. TELOS GHOST is a registered trademark of Telos Corporation. Three areas in which the existing architecture suffers are: 1) the static monolithic nature of the private virtual network due to the automated nature of the deployment in the cloud service provider; 2) the time necessary for the transit nodes to become available through the announcement (the traditional probationary period is waived because all nodes are under Telos' control, but announcement of availability still occurs); and 3) consensus voting protocol and the latencies incurred due to the data exchange operating at the application layer (layer 7) of the network. The TELOS GHOST network is a private network to which only authorized users are permitted access on which all nodes are private. The TELOS GHOST network can exit to the public internet, a private cloud, and an on-premises enclave. In addition, the TELOS GHOST network can hide mobile communications: voice, video, chat and data. Details of the TELOS GHOST secure network access system are provided in U.S. Pat. Nos. 8,832,311, 8,904,036, and 9,130,911, all of which are hereby incorporated herein in their entireties.

FIG. 3B is an overall system diagram of the current TELOS GHOST secure network access system 380 implementation using onion routing. As seen in FIG. 3B, multiple client devices 381 can access the system 380 using either WiFi or Cellular communication connections either through a virtual access system 382 or directly to the Telos Ghost cloud 385 through one of multiple local public access nodes 386. The virtual access system 382 uses a firewall to receive a connection request from a client device 381 for a target and then routes the request through one of multiple servers and one of multiple Virtual Hardware Client (VHWC) nodes (such as travel routers, for example, but not limited to, a SLATE GL-AR750 small form factor router that provides OpenVPN connectivity and comes with a Wide Area Network (WAN) Ethernet port, two Local Area Network (LAN) Ethernet ports, and a WiFi capability over both 2.4 GHz and 5 GHz) to one of the multiple local public access nodes 386 and into the Telos Ghost cloud 385. Regardless of the path, the request is passed from the multiple local public access nodes 386 to a transit cloud 387 within which multiple transit nodes 388 are available and through which a secure path is determined. The request can exit the transit cloud 387 and the Telos Ghost cloud 385 through one of multiple predefined exit nodes 389 based on a location of the target, which can include, for example, but is not limited to, the Internet 396, as well as other devices.

The diagram in FIG. 3B also includes: an on-premises network access system 390 to permit an internal intranet to connect through an exit node and a firewall to securely communicate through the transit cloud 387; a management network 392 with an admin exit node to permit the management network 392 to connect through a separate firewall to and securely communicate through the transit cloud 387; a cloaked services system 394, also with an admin exit node and another separate firewall to permit the cloaked services system 394 to connect to and securely communicate through the transit cloud 387; and a network access cloud 395, also with another exit node and separate firewall to permit the network access cloud 395 to connect to and securely communicate through the transit cloud 387.

The time to coalesce a private Tor network must be considered when network maintenance is performed as it adds to the time required for the network to become available after being shut off for any maintenance effort. Further, the latency added to the data transfer across the network limits the applications that can use the network in an effective manner. For example, real-time operation is often not possible and interactive applications, such as voice and video can suffer in usability because of the lag in the delivery of the underlying content. Therefore, what is needed is a system and method to provide fast and secure online location protection, and, more particularly, to provide fast and secure location obfuscation for network traffic.

SUMMARY

Embodiments of the presently disclosed subject matter replace the existing Tor tunnel system requirement for transit node announcement and consensus voting by a predictable creation and configuration of network nodes and reduces latency times by operating at a lower layer in the 7-layer Open Systems Interconnection (OSI) model of network communications from the International Organization for Standardization (ISO), specifically, with a nested WIREGUARD© secure virtual private network (VPN) tunnel network 400 (which is interchangeably referred to herein as a WIREGUARD tunnel network and a WIREGUARD implementation) at a network layer (OSI Model layer 3) 425, as seen in FIG. 4 and as detailed and described at https://www.wireguard.com/, all of which is hereby incorporated herein by reference. WIREGUARD is a registered trademark of Jason A. Donenfeld.

Whereas, as seen in FIG. 2, the original Tor protocol achieved onion routing at the data level by successively encrypting the data and the successive node IP address, however, as seen in FIG. 4, embodiments of the presently disclosed subject matter achieve onion routing by nesting consecutive secure VPN tunnels in the nested WIREGUARD tunnel network 400 at the network layer 425 of the underlying operating system using a nested WIREGUARD tunnel implementation without encrypting the data with the successive node's IP address. This allows the data to be successively decrypted at each node in the circuit at the network layer 425 as it transits through the circuit directly rather than through an application layer 405, as in FIG. 3, thus reducing latency. In FIG. 4, the underlying circuit creation can be managed dynamically, for example, but not limited to, by the creation of nodes with a choice of underlying implementations in a cloud environment such as virtual machines, Docker containers or a Kubernetes pod. The individual nodes in the nested VPN configurations are again limited to knowing only the previous and following nodes in the circuit using port forwarding rules at the network layer 425 utilizing the iptables capabilities of the underlying operating system. Specifically, in FIG. 5, to enable the nested WIREGUARD tunnel network 500, the data is encrypted at each entrance into individual nested tunnels wg0, wg1, wg2. In this case, the "onion" is about the nested encryption of the tunnels wg0, wg1, wg2 rather than the layered encryption of the Tor "onion" data packet 201 as seen in FIG. 2. Unlike in the regular Tor network, in FIG. 5, in the nested WIREGUARD tunnel network 500 there is no need to include IP addresses 214, 215 of the circuit within the data transport, as shown in FIG. 2, because, as seen in FIG. 5, it is "built in" to the WIREGUARD circuit as reflected in the configuration of the nodes when created.

Within the WIREGUARD protocol, secure onion routing is accomplished through the nested WIREGUARD tunnels wg0, wg1, wg2 as shown in FIG. 5. In FIG. 5, in the nested tunneling approach, when a client device or a user device 550 requests to use the network, for example, to send a secure message or have a phone call, which can be generally referred to as traffic, over an OpenVPN tunnel 557 from an OpenVPN client software running on the client device where the traffic is encrypted with the OpenVPN protocol to an OpenVPN server software running on an access node 555 where the traffic is decrypted by the OpenVPN server before it is sent from the access node 555 to an exit node 570 through the nested WIREGUARD tunnels wg0, wg1, wg2. A first WIREGUARD tunnel wg0 is created from the access node 555 to a first transit node 560 over a normal mode of communication in the protocol. A second WIREGUARD tunnel wg1, is created from the access node 555 to a second transit node 565 over the first WIREGUARD tunnel wg0 using the normal mode of communication. A third WIREGUARD tunnel wg2, is created from the access node 555 to the exit node 570 over the second WIREGUARD tunnel wg1 and the normal mode of communication where the traffic is finally decrypted and sent from the exit node 570 over an ethernet connection 572 to a target device 575. The combination of the first WIREGUARD tunnel wg0, the second WIREGUARD tunnel wg1, and the third WIREGUARD tunnel wg2 form a nested WIREGUARD tunnel 562. In some embodiments of the presently disclosed subject matter, the nested WIREGUARD tunnels can be created as native Linux tunnels and operate over UDP connections between the endpoints In an embodiment of the presently disclosed subject matter, as shown in FIG. 5, the first tunnel wg0 is created between the access node 555 and the first transit node 560 over the nodes' public IP addresses using UDP over port 51280. The second WIREGUARD tunnel wg1 is created between the access node 555 and the second transit node 565 operating through the first WIREGUARD tunnel wg0 to the first transit node 560 using UDP over port 51281 and then via redirection to port 51281 to the public IP address of the second transit node 565. The third WIREGUARD tunnel wg2 is created between the access node 555 and the exit node 570 operating through the second WIREGUARD tunnel wg1 running through the first tunnel wg0 to the second transit node 565 using UDP over port 51282 and then via redirection to port 51282 to the public IP address of the exit node 570, which then connects to the target device 575.

The TELOS GHOST network currently utilizes the Tor protocol for data transport between the access node and the exit node to create a circuit over which an open source Virtual Private Network (OpenVPN©) traffic passes between the source and destination nodes. OpenVPN is a registered trademark of OPENVPN, INC. of Pleasanton, California. However, as seen in FIG. 5, the use of WIREGUARD tunnels as a replacement for the data transport of that traffic improves the capacity and performance of the TELOS GHOST network, while significantly reducing the overall complexity of the deployment. Additionally, and importantly, the WIREGUARD approach does not reduce the security posture of the resulting TELOS GHOST network.

Feature Comparison.

Onion Routing. Both the Tor and the WIREGUARD approaches provide onion routing, but in very different ways. The Tor approach encapsulates and encrypts the routing information and the data in a reverse recursive approach, that is, starting with the last node in the circuit first at the access node and the onion is peeled at each successive node in the circuit as the data transits the circuit, as seen in FIG. 2. In contrast, the WIREGUARD approach shown in FIG. 5 encapsulates the routing information in the nested tunnels and all subsequent data including TCP/IP headers with addressing information and is encrypted upon entry to each tunnel.

All circuit information is known at the access node within the Tor approach when the access node requests a circuit from the directory authorities and uses that information to create the encrypted data onion in FIG. 2. In contrast, within the WIREGUARD approach, due to port selection on progressive nodes, no circuit information is known at the access node. So, while the access node knows the public keys of the access node and the exit node at the end of each of the WIREGUARD tunnels (which it also knows under the original Tor implementation in order to reverse recursively encrypt the data), it does not know the IP addresses of those nodes. As a result, the routing information of the circuit is effectively distributed sequentially within the iptables forwarding rules at each node along the path, providing greater security Encryption.

While the Tor approach uses AES-256 encryption, the WIREGUARD approach uses multiple encryption algorithms, which provides a comparable level of security to the Tor approach. Specifically, the encryption algorithms used in the WIREGUARD approach include:

ChaCha20 for symmetric encryption, authenticated with Poly1305, using RFC7539's AEAD construction;

Curve25519 for ECDH;

BLAKE2s for hashing and keyed hashing, described in RFC7693;

SipHash24 for hashtable keys; and

HKDF for key derivation, as described in RFC5869.

Anonymity at Intermediate Nodes.

In the original Tor network, intermediate nodes can be located anywhere around the world, and are owned by any number of individuals, so the Tor onion routing approach limits the routing information at any individual node to the preceding and subsequent nodes because the nodes are untrusted. In other words, the nodes in the Tor network have public IP addresses that can be seen by anyone on the network.

In the TELOS GHOST network, as currently operated, all nodes are obtained within AWS under control of a single AWS account and can use both public and private IP addresses. The WIREGUARD protocol can also utilize public IP addresses, which can be restricted with AWS security groups to preclude external snooping. In addition to using public IP addresses, the WIREGUARD protocol has been configured as well as to use private IP addresses in an on-premises network for transport. In the private IP addresses embodiment, a load balancer is used in front of the access nodes and a network address translation (NAT) gateway is used to cloak the exit nodes, so, as a result, all of the internal nodes can be private IP addresses, which are completely hidden from outside view. These configurations are described in more detail below in relation to FIGS. 6 and 7. However, because the network can be locked down and because the nodes are privately owned by the system owner, either directly or indirectly, within AWS, it is believed that the only exposure would be due to an insider threat, rather than untrusted operators having access to the public IP addresses. This is in keeping with the observation that wiretap threats in a LAN are remediated by the location of the nodes. For example, within LAN environments, at least, wiretap threats can be addressed in the same way that they are addressed in any other trusted facility; by physical, procedural, and administrative security measures.

Embodiments of the presently disclosed subject matter improve upon the existing Tor protocol by simplifying the network creation with a reduction in the number of different components further reducing the time for a network to become operational, allowing for a microservices architecture that supports dynamic scalability, and reducing the latency and increasing the throughput of the resulting network. The simplified network creation and reduced operational deployment time also reduces the cost to deploy and maintain the network.

The use in a microservices architecture further allows dynamic scalability of the network, permitting more cost-effective deployments in environments that have dynamic use patterns, for example, but not limited to, traditional educational and business environments with some sort of set primary "nine to five" hours of operation.

The presently disclosed subject matter supports a "drop-in" replacement for the existing TELOS GHOST network from a functional perspective, so all existing applications of the current Telos Ghost network seen in FIG. 3B remain. The benefits of cost reduction and significant performance improvement allow expanded market and profit opportunities.

DETAILED DESCRIPTION

Definitions

Figure 1:
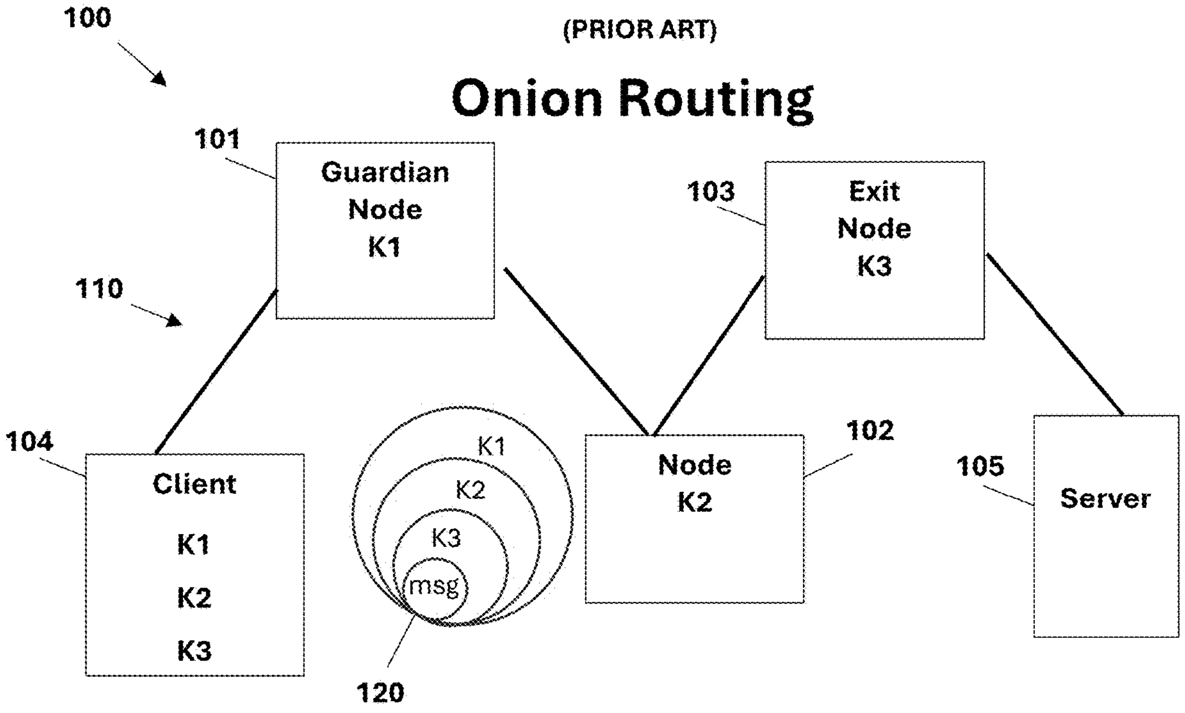
FIG. 1 (PRIOR ART)
FIG. 1 is a diagram of a prior art onion routing system for location obfuscation for network traffic.

Where the definition of terms departs from the commonly used meaning of the term, applicant intends to utilize the definitions provided below, unless specifically indicated.

For the purposes of the disclosed subject matter, directional terms such as "lower," "above," "below," "inside," "outside," etc., are merely used for convenience in describing the various embodiments of the presently disclosed subject matter.

For the purposes of the presently disclosed subject matter, the term "access node" or "ingress node" refers to a node that reroutes traffic from a client node to a tunnel circuit and encrypts the traffic prior to sending the traffic to the tunnel circuit. An access node may be part of a separate device or may be part of a client device including the client node.

For the purposes of the presently disclosed subject matter, the term "client device" refers to electronic devices that may be used to access a data network or a communication network. Examples of client devices include, but are not limited to, personal computers, wearable computers, personal data assistants, cell phones, landline telephones, laptops, tablet computers, handheld gaming devices, and video game players. When an access node is part of a separate device that is not part of a client device, the terms "client device" and "client node" may be used interchangeably.

For the purposes of the presently disclosed subject matter, the term "exit node" or "egress node" refers to a node that reroutes encrypted traffic from a tunnel circuit to a server node and decrypts the encrypted traffic prior to sending the traffic to the server node. An exit node or an egress node may be part of a separate device or may be part of a server including the server node.

For the purposes of the presently disclosed subject matter, the term "logically adjacent node" refers to the node from which a given node receives private traffic and the node to which a given node sends private traffic.

For purposes of the presently disclosed subject matter, the term "mode of communication" and the term "communication link" refer to any suitable technology or device known and available in the art for communicating between two or more devices. A mode of communication may be achieved or carried out through any suitable medium, such as any wired or wireless connections as well as any protocols, including, but not limited to: the Internet; GMR (Geo-Mobile Radio); TCP/IP; MOD BUS RTU, MODBUS ASCII, and MODBUS TCP; XML; Ethernet; file transfer protocol (FTP); Bluetooth®; ZigBee®; e-mail, such as SMTP; cellular modems; cellular phone networks, such as CDMA and TDMA; radio signals or remote terminal units (RTU) coupled to radio frequency transmitters; satellite transmission; SDI-12; existing telephone or communication networks or wiring; a standard public switched telephone network (PSTN); dial-up using landline or telephone; a wireless network such as Wi-Fi; a wide area network (WAN); a wireless local area network (WLAN); a local area network (LAN) or a metropolitan area network (MAN); a cable Internet connection; short message system (SMS); dial-modem; a point-to-point link; global system for mobile communications (GSM, 3GSM), general packet radio services (GPRS), evolution-data optimized (EV-DO), enhanced data rates for GSM evolution (EDGE), digital enhanced cordless telecommunications (DECT), integrated digital enhanced network (iDEN), universal mobile telecommunications systems (UMTS) or advanced mobile phone systems (AMPS); or any other means for communicating between two or more devices known to those skilled in the art.

For the purposes of the presently disclosed subject matter, the term "nested WIREGUARD tunnels" refers to a logical nesting of two or more virtual tunnel circuits where a first WIREGUARD tunnel is created from an access node to a first transit node. A second WIREGUARD tunnel is created from the access node to a second transit node routing the traffic through the first WIREGUARD tunnel. A third WIREGUARD tunnel is created from the access node to the exit node through the second WIREGUARD tunnel and the first WIREGUARD tunnel. Each of these tunnels are established using the WIREGUARD keys of the corresponding endpoints and the routing is established such that the traffic is transparently forwarded across each intermediary node to ensure that a node only communicates with the predecessor and successor nodes in the circuit.

For the purposes of the presently disclosed subject matter, the term "tunnel circuit" is an ordered series of logically adjacent nodes.

For the purposes of the presently disclosed subject matter, the term "network" refers to a telecommunications system used to send and receive data.

For the purposes of the presently disclosed subject matter, the term "onion router" refers to a device that employs multiple layers of encryption in order to provide confidentiality and anonymity.

For the purposes of the presently disclosed subject matter, the term "private access node" or "private ingress node" refers to an access node or an ingress node that is connected to other nodes only by private connections.

For the purposes of the presently disclosed subject matter the term “destination” or “server” or “target” or “target device” refers to the final termination point of the communication circuit initiated by a client application (e.g., web browser, cell phone call, text message). When an exit node or an egress node is part of a separate device that is not part of a server, the terms “server” and “server node” may be used interchangeably.

For the purposes of the presently disclosed subject matter, the term “transit node” refers to a transit node or router whose sole purpose is to route traffic through it to another transit node or an exit or an egress node using a secure communications channel, within the secure communications channel.

The presently disclosed subject matter will now be described with reference to the drawing figures, in which like reference numerals refer to like parts throughout. Embodiments of the presently disclosed subject matter advantageously provide systems and computer-based methods for planning missions, as described in more detail below.

Previously, the system operated using onion routing through the Tor software, where multiple layers of encryption are wrapped around the data being transported through the network and these layers are “peeled” back through each hop in the network to determine the next recipient. Within the prior system this is implemented at the application layer as a “circuit” with individual hops as circuits are created and broken down to achieve a dynamic nature to the transit cloud to generate an ever-changing configuration to limit any static attack surface.

In contrast, the WIREGUARD VPN tunnel is an Open Systems Interconnection (OSI) layer 3 (that is, network layer) peer-to-peer network communication protocol that can be implemented directly in a Linux kernel to create virtual network interfaces that can be used to route traffic and currently employs Onion Routing to provide location obfuscation for network traffic. Two areas in which the existing Tor protocol suffers are: 1) the time necessary for the transit nodes to become available through the announcement and consensus voting protocol for a new instance of a private Tor network; and 2) the latencies incurred due to the data exchange operating at the application layer (that is, layer 7) of the network.

The WIREGUARD Protocol and the TELOS GHOST Network Deployment Environment.

The WIREGUARD Protocol.

The WIREGUARD VPN utilizes state-of-the-art cryptography to be faster, simpler, leaner, and more useful than IPsec, while avoiding the known issues with IPsec’s complexity and the administrative burden it requires. The WIREGUARD VPN is designed to be better performing than OpenVPN. The WIREGUARD system is designed as a general-purpose VPN for running on embedded interfaces and super computers alike, fit for many different circumstances, such as smart phones and fully loaded backbone routers. The WIREGUARD configuration is performed on a peer-to-peer basis and operates within the Linux kernel. The peer-to-peer basis allows configuration between peers through a public key mechanism like the “ssh” keypair exchange.

The TELOS GHOST Network Deployment Environment.

Figure 5:
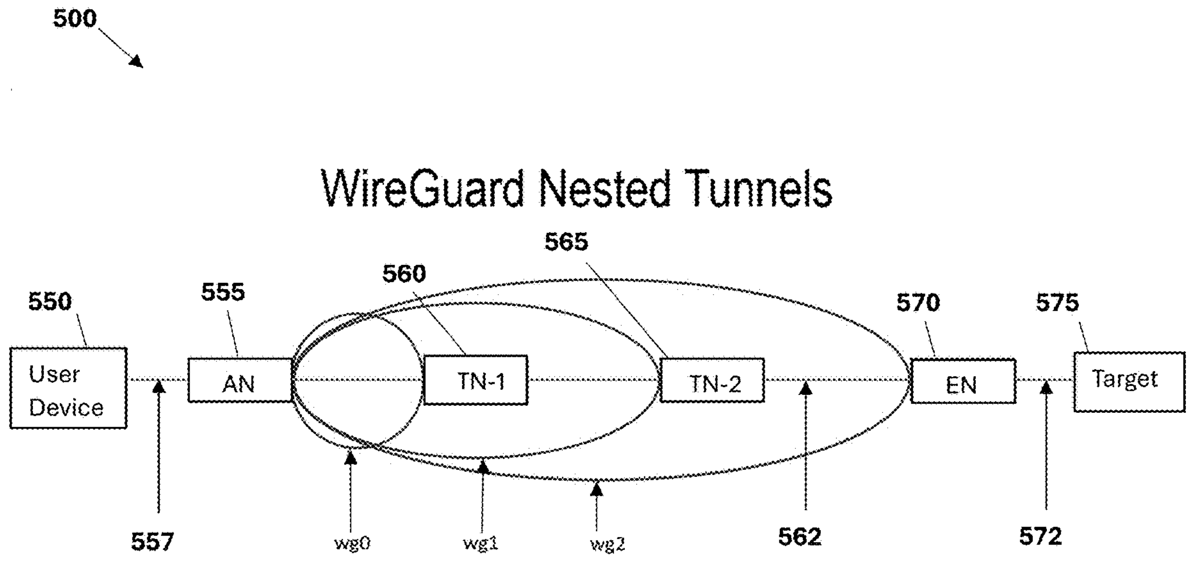
FIG. 5 is a system diagram showing an implementation of a WIREGUARD protocol implementation with nested tunnels for location obfuscation for network traffic, in accordance with an embodiment of the presently disclosed subject matter.

In the WIREGUARD protocol deployment, a simple onion routing circuit was configured with AWS EC2 virtual machines consisting of a single access node, two transit nodes and an exit node within a single AWS region. Additional administrative components, for example, but not limited to, a Domain Controller and a Managed Active Directory were also created for authentication purposes. Nested WIREGUARD tunnels were deployed between the various nodes for data transport. The data routing for the nested tunnels for a traditional exit node is shown in FIG. 5.

Embodiments of the presently disclosed subject matter replace the requirement for transit node announcement and consensus voting by using a predictable creation and configuration of the network nodes and reduces the latency by operating at a lower OSI layer, the network layer (that is, layer 3) of the network. This improves upon the existing Tor protocol by simplifying the network creation with a reduction in the number of different components further reducing the time for a network to become operational, allows for a microservices architecture that supports dynamic scalability and reduces the latency and increases the throughput of the resulting network. The simplified network creation and reduced operational deployment time reduces the cost to deploy and maintain the network.

in addition, the use in a microservices architecture further allows dynamic scalability of the network, permitting more cost-effective deployments in environments that have dynamic use patterns, for example, but not limited to, traditional educational and business environments with some sort of primary “nine to five” hours of operation.

Figure 2:
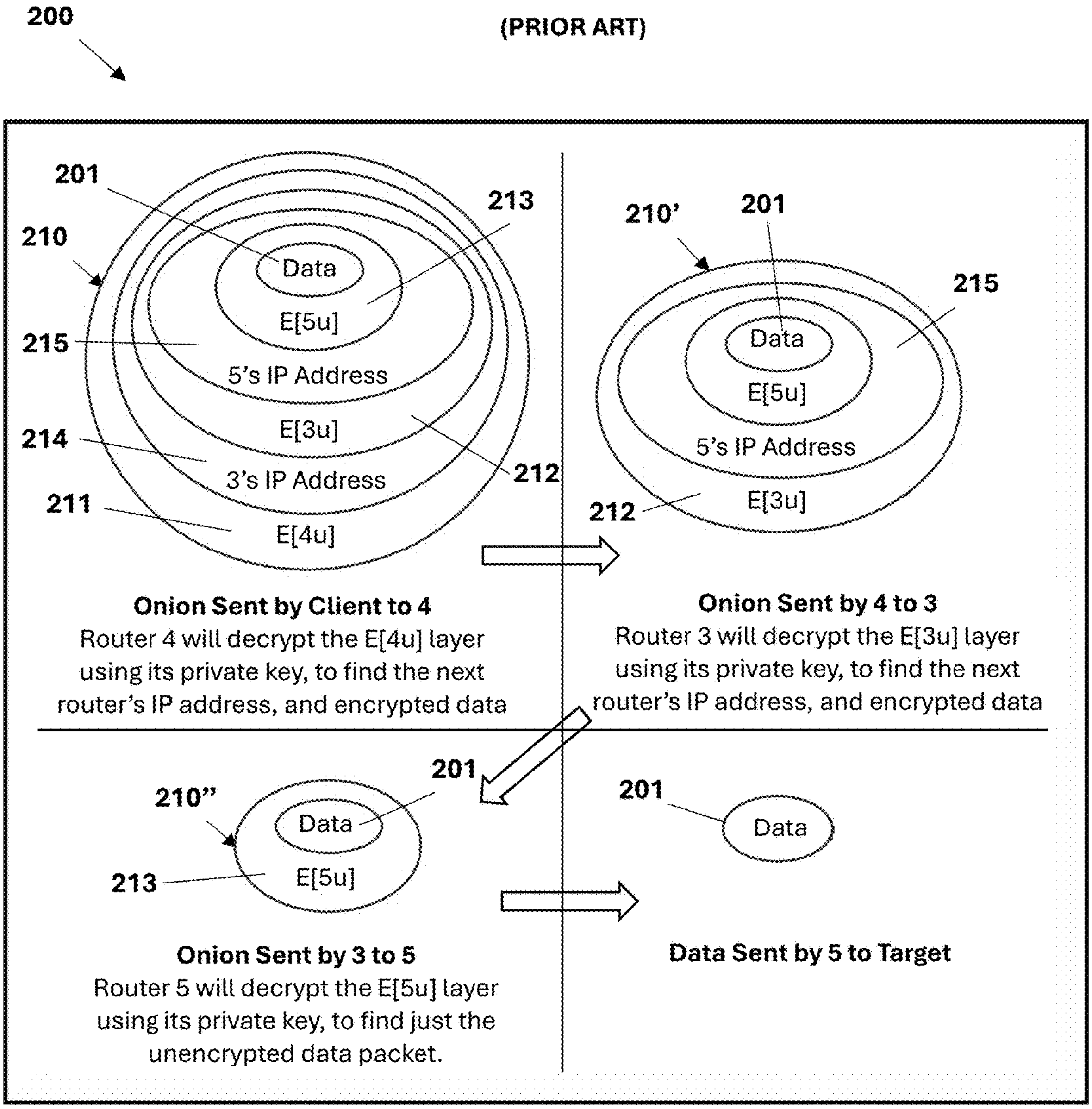
FIG. 2 (PRIOR ART)
FIG. 2 is a diagram of how data is encrypted for transmission over a prior art onion routing system.
Figure 3A:
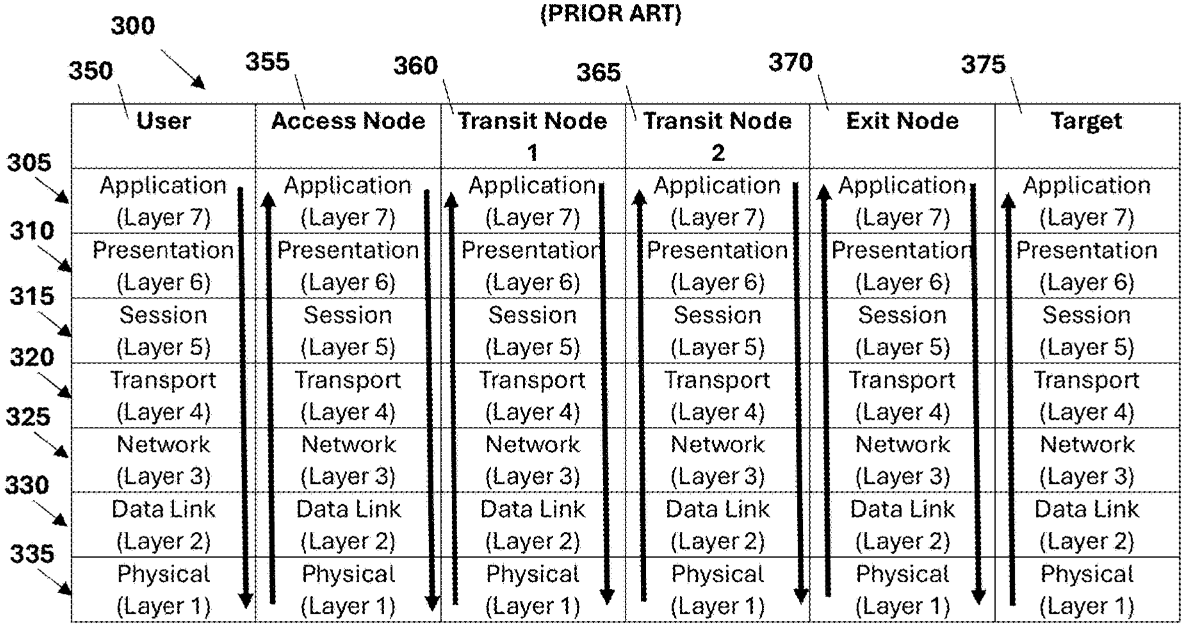
FIG. 3A (PRIOR ART)
FIG. 3A is a diagram of a prior art onion routing data flow model.
Figure 4:
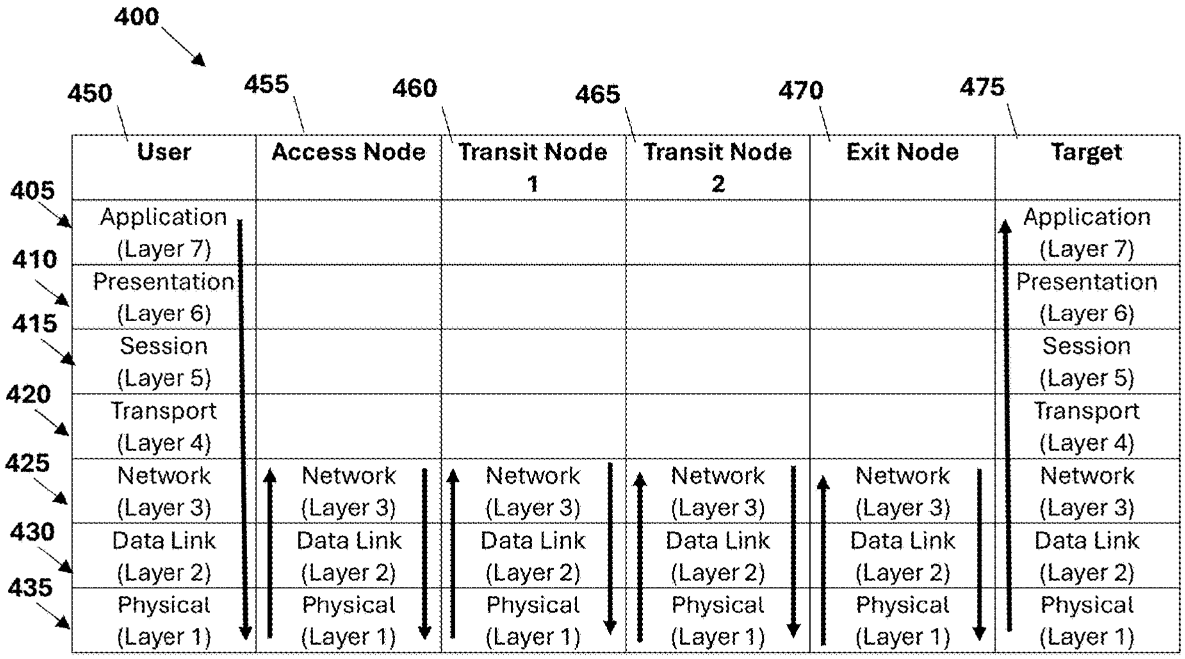
FIG. 4 is a diagram of a data flow model for location obfuscation for network traffic, in accordance with an embodiment of the presently disclosed subject matter.

Similar to the Tor network, a WIREGUARD network transmits data from the origin to the destination through a series of nodes. However, instead of encrypting the data into an object that is passed at the application layer as in Tor and as shown in FIG. 2, the data is recursively encrypted in transmission through nested WIREGUARD tunnels as it transits the network, as seen in FIG. 4. The order of encryption is effectively the same, starting with the exit node and working back to the access node, but performed going in and out of the tunnels at the network layer 425 rather than, as seen in FIG. 3A for the Tor network, at the application layer 305. By nesting the WIREGUARD tunnels for communication, in FIG. 5, a virtual onion is created around the data as it traverses the circuit.

This virtual nesting is performed as shown in FIG. 5 for a two-transit node circuit WIREGUARD tunnel network 500, but expansion to additional nested tunnels with more than two transit nodes is straightforward. The first WIREGUARD tunnel wg0 is established from an access node 555 to a first transit node 560. A second WIREGUARD tunnel wg1 is established from the access node 555 to the second transit node 565 routing the traffic through the first WIREGUARD tunnel wg0. Finally, a third WIREGUARD tunnel wg2 is established from the access node 555 to the exit node 570 through the second WIREGUARD tunnel wg1. Each of these tunnels are established using the WIREGUARD keys of the corresponding endpoints and the routing is established such that the traffic is transparently forwarded across each intermediary node to ensure that a node only communicates with the predecessor and successor nodes in the circuit. For example, the first WIREGUARD tunnel wg0 uses port 51821 (the default WIREGUARD port is 51820), the second WIREGUARD tunnel wg1 uses port 51822 with traffic passing through the first WIREGUARD tunnel wg0 and the third WIREGUARD tunnel wg2 uses port 51823 with traffic passing through the second WIREGUARD tunnel wg1. The first transit node 560 passes any traffic on ports 51822 and 51823 between the access node 555 and the second transit node 565 while the second transit node 565 passes any traffic on port 51823 between the first access node 560 and the exit node 570. The peer configuration of the individual tunnels contains the encryption key information of the corresponding tunnel endpoint, while the routing and port forwarding configuration on each node only refers to the next hop in the circuit.

In contrast, as seen in FIG. 2, in the Tor implementation the onion 210 must be created with "next hop" information, thus knowledge of the entire circuit resides in an operational component of the network, however, within the WIREGUARD network in FIG. 5, this "next hop" information is limited to and distributed across the individual nodes in the network that has need for that information.

It is the separation of the encrypting material, that is, the peer keys in the WIREGUARD implementation 500, from the IP addresses of the actual endpoints through the use of the port forwarding on the internal nodes that allows the WIREGUARD transport protocol to mimic the node anonymity in the Tor implementation. Each node only knows the source and destination of the next hop in the network with which it exchanges packets and not about any nodes beyond that.

The exemplar embodiment of the WIREGUARD implementation 500, as seen in FIG. 5, is a multi-hop tunneling configuration with four nodes and three nested tunnels. Specifically, four Community Enterprise Operating System Linux 7 (Centos Linux 7) virtual machines were created and assigned sequential IP addresses for simplicity and correlating of tunnels. These nodes included the access node 555, the first transit node 560, the second transit node 565, and the exit node 570. It should be noted that although the Hosts are in the same Class C (192.168.182.0/24) network, they do not use the Class C addresses beyond the configured single-hop, that is, the access node 555 to the first transit node 560, the first transit node 560 to the second transit node 565, the second transit node 565 to the exit node 570 communication. The three nested tunnels include the first WIREGUARD tunnel wg0, the second WIREGUARD tunnel wg1, and the third WIREGUARD tunnel wg2.

Overlaying this on FIG. 5, a Host 1 (192.168.182.113) (access node 555) is the leading edge of the effort. It has a tunnel through the wg0 interface peering with a wg0 interface on a Host 2 (192.168.182.114) (transit1 node 560) over their respective local ethernet interfaces. The Host 1 also has a tunnel through the wg1 interface peering with a wg1 interface on a Host 3 (192.168.182.115) (transit2 node 565) over the wg0 interfaces just created. The Host 1 finally has a tunnel through the wg2 interface peering with a wg2 interface on a Host 4 (192.168.182.116) (exit node 570) over the wg1 interfaces just created. All this traffic occurs without any of the Hosts knowing the actual IP address of any of the other Hosts. The various naming conventions for the virtual network interfaces are merely to maintain correlation between the hosts and different naming conventions are possible.

As a result, traffic flowing from Host 1 to Host 4 goes over wg2, which goes over wg1, which goes over wg0, effectively creating a similar sort of layering as onion routing, but without the need to include the IP addresses, so, while not an exact 1-1 match, the similarity can be seen.

For all hosts, the sys.net.ipv4.ip_forward value was set to 1 and the iptables were flushed. Individual configuration details, testing and other comments follow. All ssh commands were executed from Host 1. Also note that each successive tunnel operated over a different port. The first hop was the default 51820, the second 52821, and the third 51822.

For Host 1 the virtual network interface wg0 was created using:

```
# wg show wg0
interface: wg0
  public key: 0N8dqLe9Pj0k8cgua7R9Gv2yXd6H+Sq+
    olhXK6vpKjQ=
  private key: (hidden)
  listening port: 51820
peer: dabeyd3hRa5qylVCoWyYahFMKLOFnkTfls5u-
  iEUz10Y=
  endpoint: 192.168.182.114:51820
  allowed ips: 10.0.0.2/32, 0.0.0.0/0
  latest handshake: 11 minutes, 10 seconds ago
  transfer: 129.92 KiB received, 133.28 KiB sent
```

For the first hop, an ssh to the virtual IP address of the peer interface shows the traffic coming from Host 1's virtual interface.

```
# ssh karl@10.0.0.2
karl@10.0.0.2's password:
Last login: Mon Jan 17 15:33:29 2022
% who am i
karl pts/2 2022-01-20 17:12 (10.0.0.1)
```

For traffic to be routed over wg0, a static route was added to take the traffic off the local network and routed through wg0 for the next hop (192.168.182.115) in the nested configuration:

```
# route add-host 192.168.182.115 wg0
# wg show wg1
interface: wg1
public key: 0N8dqLe9PjOk8cgua7R9Gv2yXd6H+Sq+
  olhXK6vpKjQ=
private key: (hidden)
listening port: 51821
fwmark: 0xca6c
peer: FnyyOlpm49pM3I/NGPPvd/3q+OfEiZGeS-
  bAtHDs K62c=
  endpoint: 192.168.182.115:51821
  allowed ips: 172.23.0.4/32, 0.0.0.0/0
  latest handshake: 22 minutes, 8 seconds ago
    transfer: 88.88 KiB received, 93.52 KiB sent
```

For the second hop an ssh to the virtual interface of Host 3 shows the traffic coming from Host 1's virtual interface, but ssh to the IP address of Host 3 shows the traffic coming from Host 2's regular ethernet, i.e., making it appear that the traffic is originating from Host 2, when in fact it originated at Host 1.

```
# ssh karl@172.23.0.4
karl@172.23.0.4's password:
Last login: Thu Jan 20 17:22:43 2022 from 172.23.0.3
[karl@WG3~]$ who am i
karl pts/1 2022-01-20 17:23 (172.23.0.3)
# ssh karl@192.168.182.115
karl@192.168.182.115's password:
Last login: Thu Jan 20 17:23:43 2022 from 172.23.0.3
[karl@WG3~]$ who am i
karl pts/1 2022-01-20 17:23 (192.168.182.114)
```

For traffic to be routed over wg1, a static route was added to take the traffic off the local network and routed through wg1 for the next hop (192.168.182.116) in the nested configuration:

```
# route add-host 192.168.182.116 wg1
# wg show wg2
interface: wg2
public key: 0N8dqLe9PjOk8cgua7R9Gv2yXd6H+Sq+
  olhXK6vpKjQ=
  private key: (hidden)
  listening port: 51822
  fwmark: 0xca6e
peer: eP2akRLPYyQcXR6CIpkjWJqKoJtE3Fjvol
  DK5IOq1Ss=
endpoint: 192.168.182.116:51822
allowed ips: 10.10.10.6/32, 0.0.0.0/0
latest handshake: 1 minute, 12 seconds ago
  transfer: 124 B received, 828 B sent
```

For the third hop an ssh to the virtual interface of Host 4 shows the traffic coming from Host 1's virtual interface again, but ssh to the IP address of Host 4 shows the traffic coming from Host 3's regular ethernet, i.e., making it appear that the traffic is originating from Host 3, when in fact it again originated at Host 1.

```
[root@localhost wireguard]# ssh karl@10.10.10.6
karl@10.10.10.6's password:
Last login: Thu Jan 20 16:16:02 2022 from 10.10.10.5
[karl@wg4~]$ who am i
karl pts/1 2022-01-20 17:55 (10.10.10.5)
# ssh karl@192.168.182.116
karl@192.168.182.116's password:
Last login: Thu Jan 20 17:55:11 2022 from 10.10.10.5
[karl@wg4~]$ who am i
karl pts/1 2022-01-20 17:55 (192.168.182.115)
```

For the virtual interface of Host 2 the virtual network interface wg0 was created using:

```
# wg
interface: wg0
  public key: dabeyd3hRa5qylVCoWyYahFMKLOFnk
    Tfls5uiEUz10Y=
  private key: (hidden)
  listening port: 51820
    fwmark: 0xca6c
peer: 0N8dqLe9PjOk8cgua7R9Gv2yXd6H+Sq+olhXK6
  vpKjQ=
  endpoint: 192.168.182.113:51820
  allowed ips: 10.0.0.1/32, 0.0.0.0/0
  latest handshake: 1 minute, 48 seconds ago
  transfer: 170.83 KiB received, 176.95 KiB sent
```

For the virtual interface of Host 3 the virtual network interface wg1 was created using:

```
# wg
interface: wg1
  public key: FnyyOlpm49pM3I/NGPPvd/3q+OfE
    iZGeSbAtHDsK62c=
  private key: (hidden)
listening port: 51821
  fwmark: 0xca6c
peer: 0N8dqLe9Pj0k8cgua7R9Gv2yXd6H+Sq+
  olhXK6vpKjQ=
  endpoint: 192.168.182.114:48725
allowed ips: 172.23.0.3/32, 0.0.0.0/0
  latest handshake: 1 minute, 53 seconds ago
  transfer: 125.57 KiB received, 186.98 KiB sent
```

For the virtual interface of Host 3 the virtual network interface wg1 was created using:

```
# wg
interface: wg2
  public key: eP2akRLPYyQcXR6CIpkjWJqKoJtE3F
    jvolDK5IOq1Ss=
  private key: (hidden)
  listening port: 51822
  fwmark: 0xca6c
peer: 0N8dqLe9Pj0k8cgua7R9Gv2yXd6H+Sq+olh
  XK6vpKjQ=
  endpoint: 192.168.182.115:51822
  allowed ips: 10.10.10.5/32, 0.0.0.0/0
  latest handshake: 1 minute, 56 seconds ago
  transfer: 11.00 KiB received, 24.34 KiB sent
```

Because WIREGUARD VPN uses configuration files, the private and public keys for each host are maintained in the configuration files. This is equivalent to the public and private keys being used to identify the various transit nodes in the Tor implementation in which there is a lot more routing information visible on the starting host, specifically, the IP addresses of each node. However, when the current Tor implementation gets a circuit created, the IP addresses of the transit nodes are only available with the use of a command-line application, for example, but not limited to, Nyx, which looks up the information that is used to create the onions on the access node and displays it to an operator. Nyx is provided as open source software. In the public Tor network, for example, but not limited to, this would be the guardian or access node that would be on an originating client using the Tor browser. For the TELOS GHOST network it would be the access node.

In the nested tunneling approach in FIG. 5, the first WIREGUARD tunnel wg0, goes from the access node 555 to the first transit node 560 over the normal mode of communication, whether private or public IP addresses. The second WIREGUARD tunnel wg1, goes from the access node 555 to the second transit node 565 over the tunnel just created by first WIREGUARD tunnel wg0 and the normal mode of communication. The third WIREGUARD tunnel wg2, goes from the access node 555 to the exit node 570 over the tunnel just created by the second WIREGUARD tunnel wg1 and the normal mode of communication.

In the embodiment in FIG. 5, the access node 555 uses an OpenVPN tunnel 557 with SSL private key and certificate either via RADIUS or LDAP. In other embodiments, a pre-shared key (PSK) for IP/Sec can be used with a defined network topology up front, but this would limit the number of users to the range of IP addresses.

Network Layout.

Figure 3B:
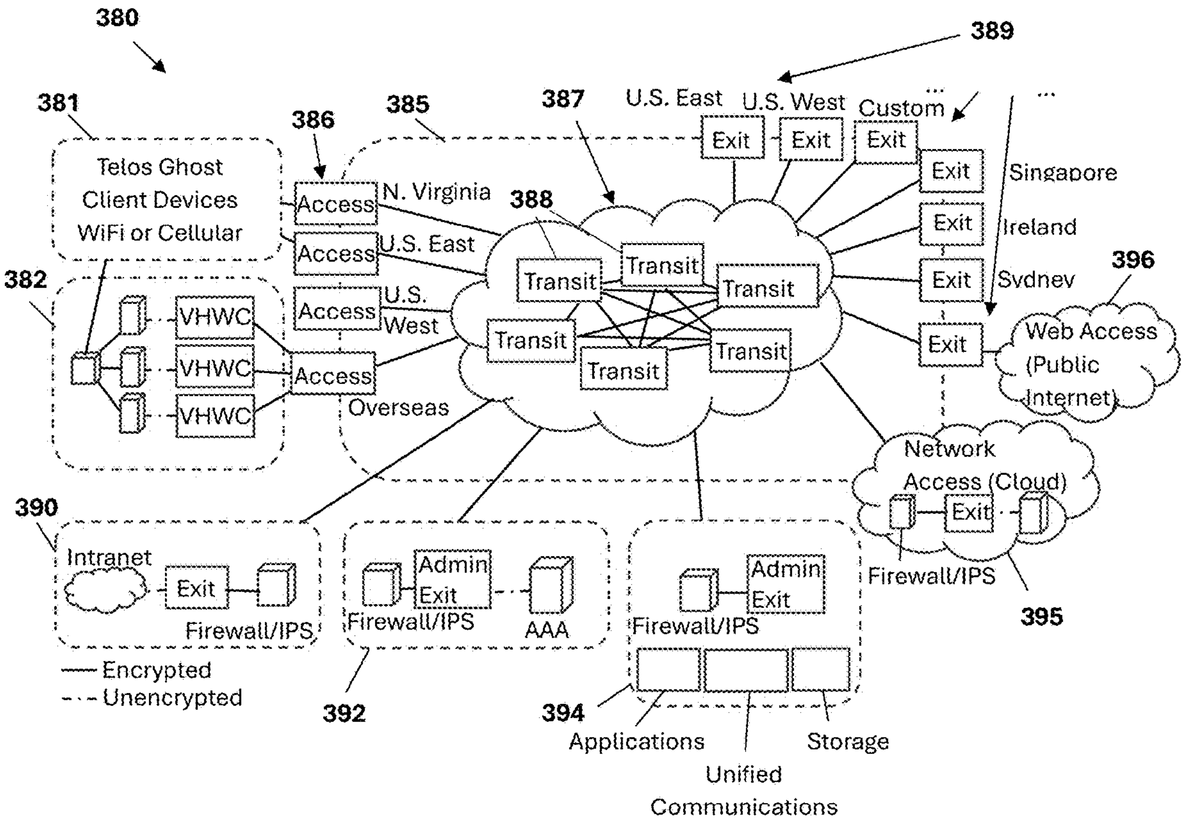
FIG. 3B (PRIOR ART)
FIG. 3B is a system diagram of a prior art onion routing system.

The WIREGUARD protocol network layout of the present embodiment mimics the traditional TELOS GHOST network layout shown, for example, in FIG. 3B.

Virtual Private Clouds.

The virtual private clouds are essentially unchanged from the exemplary traditional TELOS GHOST network deployment. Specifically, in the original Tor TELOS GHOST network, Virtual Private Clouds (VPCs) were created to contain the Elastic Compute Cloud (EC2) instances over which the Tor protocol transferred data. The access nodes 386 and transit nodes 387' were generally located together in a common region (for example, us-east-1) to reduce latency and the exit nodes 389 were placed in the desired exit region. No change was required for the WIREGUARD protocol. For the purposes of the WIREGUARD protocol, all nodes were still contained within us-east-1 but are dynamically created/destroyed during scaling events.

Security Groups were modified for the WIREGUARD implementation.

Updated Security Groups.

The security group necessary to allow the WIREGUARD nodes to communicate over UDP are added to the VPCs in which they are located.

Nodes.

The nodes used for the WIREGUARD onion routing are the access, transit, and exit nodes.

Access Nodes.

The access node 555 is connected to the OpenVPN tunnel 557 with an authentication interface (including, but not limited to RADIUS, Lightweight Directory Access Protocol (LDAP) and local authentication), and the three tunnels added to its specification. OpenVPN utilizes "plugins" for authentication and the authentication mechanisms that have been implemented include: 1) LOCAL (i.e., username/password on the access node, which is good for testing, but is not scalable); 2) RADIUS—through a RADIUS server to a back end (e.g., Windows Active Directory); and 3) LDAP—either through an LDAP interface (e.g., Windows Active Directory) or any other LDAP server.

The last digit of the tunnel's number corresponds to the last digit of the third value in the CIDR block (the X in 10.0.10X.0/24) as well as the last digit of the UDP listening port (the X in 5182X).

```
ovpn_radius_conf_path: "/etc/openvpn/pam_radius_auth.conf"
# The expected spot on a Configurator access node
#ovpn_radius_conf_path: "/etc/raddb/server/pam_radius_auth.conf"
tunnels:
wg0:
tun_cidr_block: "10.0.100.0/24"
tun_peer: "{{ghost_inventory_group}}tr01"
listen_port: 51820
wg1:
tun_cidr_block: "10.0.101.0/24"
tun_peer: "{{ghost_inventory_group}}tr02"
listen_port: 51821
wg2:
listen_port: 51822
tun_cidr_block: "10.0.102.0/24"
tun_peer: "{{ghost_inventory_group}}ex01"
```

Transit Nodes.

The transit nodes 560, 565 have their corresponding peers referring to the access node 555. As seen in FIG. 5 and below, there are two transit nodes 560, 565 in this embodiment, but additional transit nodes can be implemented.

```
guardtr01:
ec2_name_tag: "guardtr01"
aws_region: "us-east-1"
ghost_node_type: "transit"
node index: 1
tunnels:
wg0:
tun_peer: "{{ghost_inventory_group}}ac01"
guardtr02:
ec2_name_tag: "guardtr02"
aws_region: "us-east-1"
ghost_node_type: "transit"
node index: 2
tunnels:
wg1:
tun_peer: "{{ghost_inventory_group}}ac01"
```

Exit Node.

Like the transit nodes 560, 565, the exit node 570 has its corresponding peer referring to the access node.

```
guardex01:
#Northern Virginia
ec2_name_tag: "guard_guardex01"
aws_region: "us-east-1"
ghost_node_type: "exit"
node index: 1
tunnels:
wg2:
tun_peer: "{{ghost_inventory_group}}ac01"
```

Authentication Infrastructure.

The authentication infrastructure for the WIREGUARD protocol is the same as the traditional TELOS GHOST network deployment—options include a Windows Domain Controller (DC) and AWS Managed Active Directory (MAD) or an LDAP server.

Implementation.

There are two main differences in the WIREGUARD protocol from the traditional TELOS GHOST network deployment: 1) removal of all Tor software related activities, and 2) installation of the nested WIREGUARD tunnels.

Nested WIREGUARD Tunnels.

The installation and configuration of the WIREGUARD VPN is as shown above. In the scaling implementation, when a triplet of nodes is created, the creator (the scaling infrastructure) also computes peer keys and distributes these along with the port assignments for both the WIREGUARD tunnels and the iptables forwarding rules.

Installation.

The installation consists of the installation of required packages, anti-spoofing changes to AWS for the exits, to allow for source/destination address IP rewriting through the iptables rules enabling IP forwarding, adding loopback to the exit node for DNSMASQ requirements and configuring DNSMASQ for the exit node.

Configuration.

The configuration consists of setting up the peer keys on all the nodes, using the public keys from the peers along with instantiating template files to create the corresponding/etc/wireguard/wgX.conf files. The WIREGUARD services are started and enabled to automatically restart when the nodes reboot.

It should be noted that the wgX.conf files contain the necessary iptables filtering rules. Additionally, while the example shows the tunnel relationships between directly non-communicating nodes (for example, the access node 555 and the second transit node 565 and the exit node 570), the generation of the wgX.conf files uses only the corresponding public and private keys and iptables UDP forwarding ports to ensure node anonymity, which is possible because each node only knows the previous and subsequent nodes in the circuit.

Access Node OpenVPN Server.

The access node OpenVPN server is installed and configured on the access node 555 with the required packages, the necessary SSL certificates, private key, etc. and templating out the required files for the ovpn_server.conf and rule-tunX files and creating the /etc/pam.d/openvpn and/etc/openvpn/ucn.pl files. The corresponding OpenVPN tunnel 557 is then enabled and started as a service as well.

Network Deployment.

In the following embodiment description, the deployment is described as following a traditional TELOS GHOST network deployment process with respect to AWS or GCP network configuration.

Inventory.

Using an Infrastructure As Code (IaC) approach with tools such as Terraform or Ansible, a network inventory is created that contains the VPS, a management proxy/bastion host, authentication infrastructure (Windows AD/Managed Active Directory or an LDAP server), incoming region load balancer(s), access region VPCs, transit region VPCs, exit region VPCs and outgoing region Name Address Translation (NAT) gateways. Additional infrastructure components to handle the Circuit Provisioning Platform (CPP) and Application Auto-Scaling Engine (AASE) are created utilizing the individual CSPs capabilities.

Generate Node Certificates.

OpenVPN SSL Certificates are used for the OpenVPN tunnel 557 on the access node 555. No other certificates are used.

Install and Configure WIREGUARD VPN.

The WIREGUARD transport circuit is created during the scaling activity by generating code (that is, the lambda operations) that dynamically configure the nodes within the circuits for scalable operation and push the configurations to the EC2 instances as they are created during scaling events: Operational Considerations.

User Authentication.

Within the WIREGUARD implementation authentication is performed via RADIUS protocol at the client OpenVPN connection on the access node with a Windows Domain Controller (DC) and AWS Managed Active Directory (MAD) or through an LDAP lookup to an LDAP server.

Figure 6:
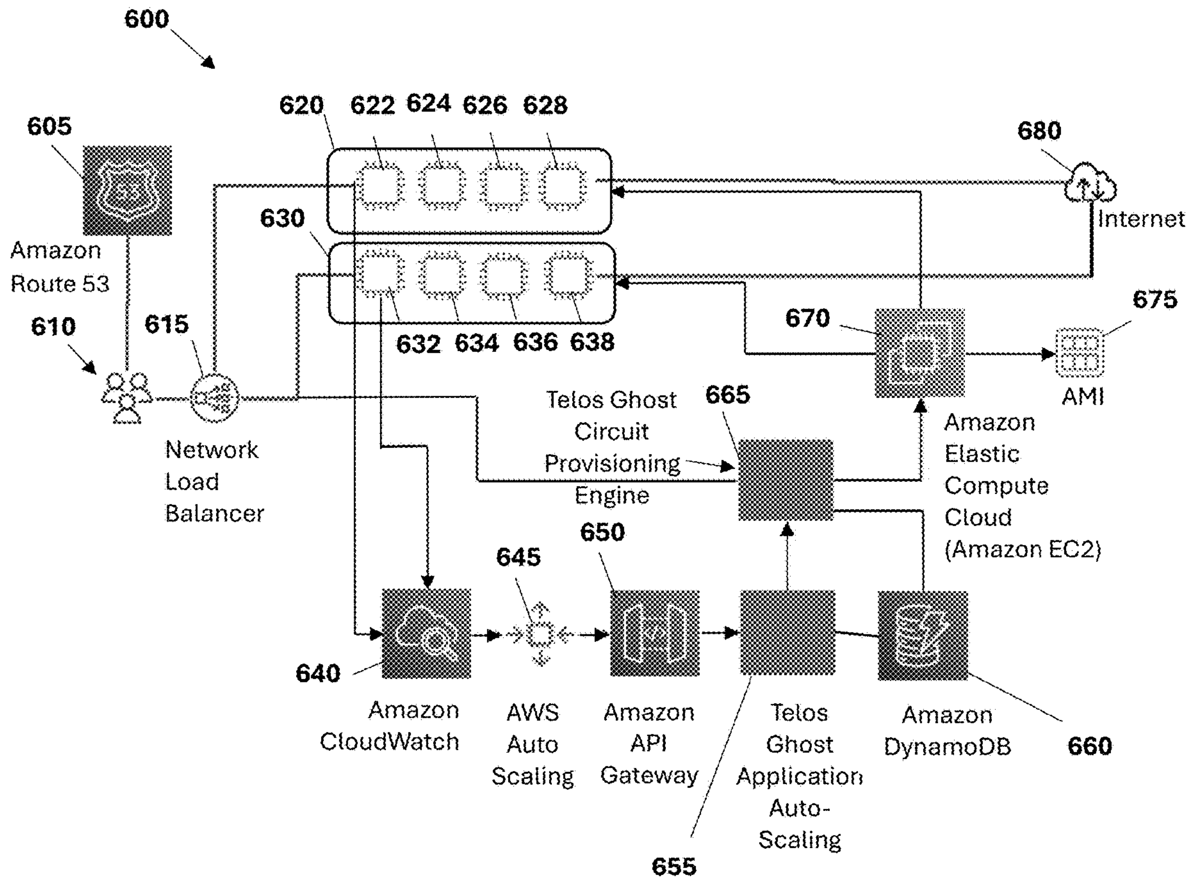
FIG. 6 is an overall system diagram showing the components of a WIREGUARD protocol implementation for location obfuscation for network traffic, in accordance with an embodiment of the presently disclosed subject matter.

FIG. 6 is an overall system diagram showing the components of a WIREGUARD protocol implementation for location obfuscation for network traffic, in accordance with an embodiment of the presently disclosed subject matter. Because the WIREGUARD protocol system is implemented using a "network-as-a-service" and "software defined networking" approach, the system elements are virtual, so there is minimal physical system hardware required. For this specific embodiment, the only requirement for each of the nodes in the circuit is that they have a version of Linux that provides a WIREGUARD driver in the kernel.

In fact, for this embodiment, a small virtual machine, for example, but not limited to, a Centos Linux 7 was used, but any other version of Linux that supports WireGuard within the kernel can be used. In additional embodiments, for example, large scale systems with many users and high bandwidth requirements, performance testing will be performed to determine the sweet spot of CPU/memory/disk/ethernet interface bandwidth to support any specific number of users.

In FIG. 6 a private WIREGUARD network 600 is shown using multiple Cloud Service Providers (CSPs), for example, but not limited to, Amazon Web Services (AWS) and Google Cloud Platform (GCP). The private WIREGUARD network 600 includes a domain name system (DNS) web service 605, for example, but not limited to, Amazon Route 53, which is communicatively connected to at least one client device 610 that is in turn communicatively connected to a network load balancer 615. The network load balancer 615 is communicatively connected to at least one virtual circuit via either an OpenVPN or an IP/Sec client interfaces, although in FIG. 6 the network load balancer 615 is shown communicatively connected to a first virtual circuit 620 and a second virtual circuit 630, and the first virtual circuit 620 includes a first access node 622 communicatively connected to the network load balancer 615 and a first virtual circuit first transit node 624, which is communicatively connected to a first virtual circuit second transit node 626, which is communicatively connected to a first virtual circuit exit node 628, which is communicatively connected to a public communication network 680, for example, but not limited to, the Internet. The first virtual circuit 620 is communicatively connected to an application monitoring system 640, for example, but not limited to, an Amazon CloudWatch service. Similarly, the second virtual circuit 630 includes a second virtual circuit access node 632 communicatively connected to the network load balancer 615 and a second virtual circuit first transit node 634, which is communicatively connected to a second virtual circuit second transit node 636, which is communicatively connected to a second virtual circuit exit node 638, which is communicatively connected to the public communication network 680. The application monitoring system 640 is communicatively connected to an auto scaling interface 645, for example, but not limited to, an AWS auto scaling interface, which is communicatively connected to an application programming interface (API) gateway 650, for example, but not limited to an Amazon API gateway. The API gateway 650 is communicatively connected to an auto-scaling system 655, for example, but not limited to, a TELOS GHOST application auto-scaling system.

The auto-scaling system 655 is communicatively connected to a serverless, NoSQL database 660, for example, but not limited to, an Amazon DynamoDB, and the application auto-scaling engine 655 is also communicatively connected to a circuit provisioning engine 665, for example, but not limited to, a TELOS GHOST circuit provisioning engine, which is also communicatively connected to the serverless, NoSQL database 660 and an elastic compute cloud web service 670, for example, but not limited to, an Amazon Elastic Compute Cloud (EC2), which is communicatively connected to a dynamic firmware resource 675, for example, but not limited to an AMI dynamic firmware resource. The elastic compute cloud web service 670 is communicatively connected to the first virtual circuit 620 and the second virtual circuit 630.

In the network 600 of FIG. 6, a domain name system (DNS) web service 605, for example, but not limited to, Amazon Route 53, is communicatively connected to at least one client 610 that is in turn communicatively connected to a network load balancer 615, which monitors the level of communication requests received on the network 600 and the currently available resources. If the network application auto-scaling engine 655 detects from the access node 622, 632 that, based on one or more operating metrics of the virtual circuits 620, 630, the level of communication requests are too much, that is, exceed the bandwidth for a number of available virtual circuits 620, 630, the application auto-scaling engine 655 sends a request to a provisioning engine 665, for example, but not limited to, a Circuit Provisioning Engine 665, for example, but not limited to, a TELOS GHOST Circuit Provisioning Engine, which will either create new virtual circuits or destroy the available virtual circuits 620, 630. The one or more operating metrics can include, but are not limited to, a bandwidth, a compute utilization, a count of active users, a load average of the access node, memory utilization, disk drive activity, etc. The virtual circuits 620, 630 each include an access node 622, 632, one first transit node 624, 634, one second transit node 626, 636, and an exit node 628, 638. In the embodiment in FIG. 6, the access node 622 is communicatively connected to a first transit node 624, which is communicatively connected to a second transit node 626, which is communicatively connected to the exit node 628. A circuit provisioning engine 665 sends a request to an elastic compute cloud web service 670, for example, but not limited to, an Amazon Elastic Compute Cloud (EC2) either for additional virtual circuits 620, 630 or to take virtual circuits 620, 630 away. Then, based on the request, the elastic compute cloud web service 670, using a dynamic firmware resource 675, for example, but not limited to an AMI dynamic firmware resource either requests an additional virtual circuit 620, 630 or the removal of an existing virtual circuit 620, 630.

In these implementations, the network load balancer 615 provides an interface for clients, i.e., users, 610 to access the network 600 and the virtual circuits 620, 630, which are also called channels, can be deployed between available regions in the CSPs. A client 610 can connect using a VPN-based software, for example, but not limited to, OpenVPN, IP/Sec, or WIREGUARD to one of the access nodes attached to the load balancer and is authenticated using various methods (for example, SSL certificates, username/password, Pre-Shared Keys, etc.). Circuits can be destroyed on a configurable time-based setting and clients reauthenticate to another access node as needed when a circuit being used is destroyed, allowing for dynamic circuit configuration. All configuration information for the nodes is pushed when they are created. Capacity can be increased or decreased based upon usage metrics. Utilizing the CSP infrastructure allows only the network load balancer and the exit node to require public IP addresses. For an enterprise deployment, all exit nodes in a given location can be placed behind an exit gateway (described below in relation to FIG. 7), resulting in only that gateway requiring a public IP address for all traffic, so all of the exit nodes remain private.

Figure 7:
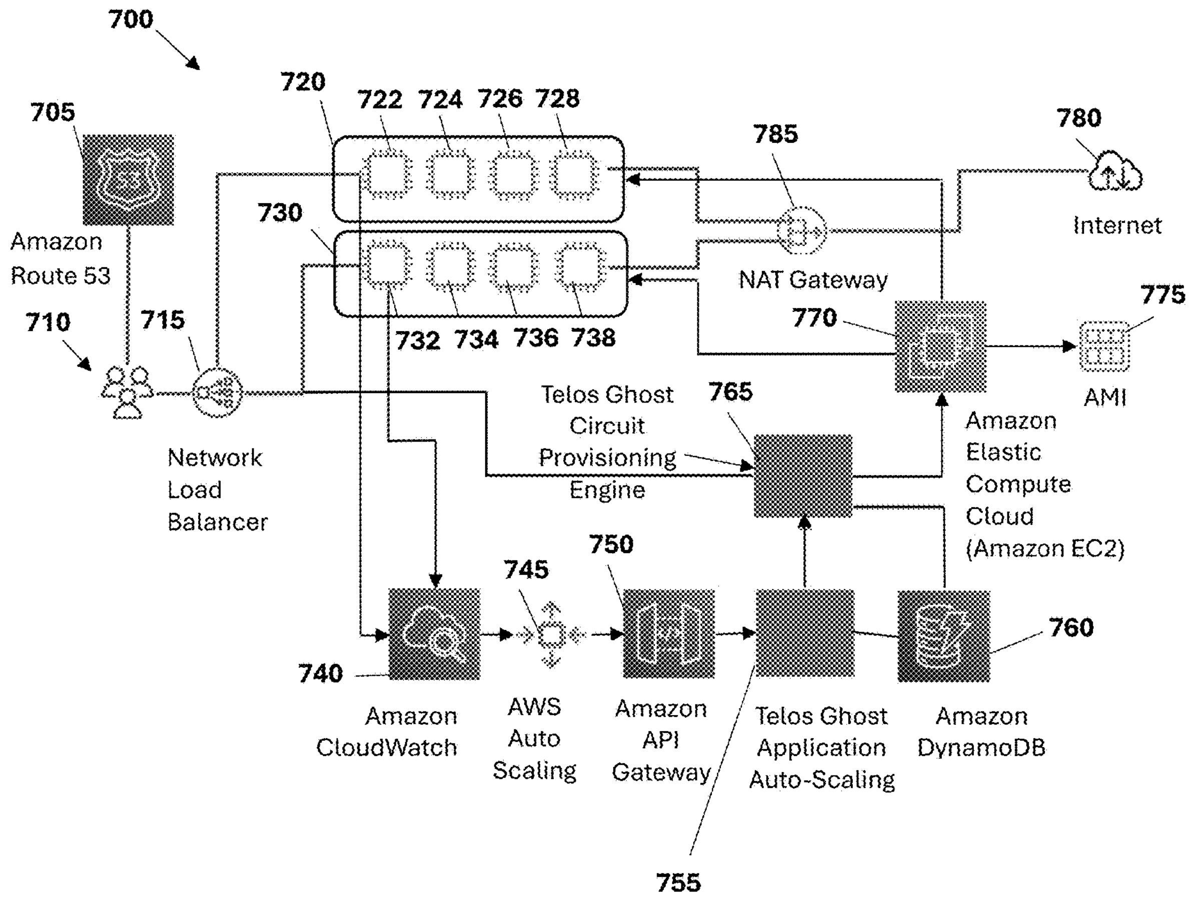
FIG. 7 is an alternate overall system diagram showing the components of a WIREGUARD protocol implementation for location obfuscation for network traffic with a NAT gateway, in accordance with an embodiment of the presently disclosed subject matter.

FIG. 7 is an alternate overall system diagram showing the components of a WIREGUARD protocol implementation for location obfuscation for network traffic with a network address translation (NAT) gateway, in accordance with an embodiment of the presently disclosed subject matter. A NAT gateway or service, can be attached to a VPC to connect instances in a private subnet, for example, but not limited to services outside the VPC, but external services cannot initiate a connection with those instances inside the private subnet.

Exit Region NAT Gateways vs. IP Addresses For Static IP.

A traditional TELOS GHOST deployment utilizes static IP addresses for the exit locations of the TELOS GHOST networks. This, along with an "exit node IP swap," which can occur one or more times a day, has allowed the exiting IP address to fluctuate and reduce exposure. Depending on the quantity of users and containerized processes, a NAT Gateway may be preferable to provide a common static IP address for all activity associated with a deployment exiting in a single location. Scaling can be accomplished by running multiple circuits to the VPC to which the NAT Gateway is attached for egress. Multiple user-selectable scaling options are provided and are based on the specific user's needs.

In FIG. 7 an alternative private WIREGUARD network 700 is shown using multiple Cloud Service Providers (CSPs), for example, but not limited to, Amazon Web Services (AWS) and Google Cloud Platform (GCP). The alternative private WIREGUARD network 700 includes a domain name system (DNS) web service 605, for example, but not limited to, Amazon Route 53, which is communicatively connected to at least one client 710 that is in turn communicatively connected to a network load balancer 715. The network load balancer 715 is communicatively connected to at least one virtual circuit, although in FIG. 7 the network load balancer 715 is shown communicatively connected to a first virtual circuit 720 and a second virtual circuit 730, and the first virtual circuit 720 includes a first access node 722 communicatively connected to the network load balancer 715 and a first virtual circuit first transit node 724, which is communicatively connected to a first virtual circuit second transit node 726, which is communicatively connected to a first virtual circuit exit node 728, which is communicatively connected to a public communication network 780 via a NAT gateway 785, for example, but not limited to, the Internet. The first virtual circuit 720 is communicatively connected to an application monitoring system 740, for example, but not limited to, Amazon CloudWatch. Similarly, the second virtual circuit 730 includes a second virtual circuit access node 732 communicatively connected to the network load balancer 715 and a second virtual circuit first transit node 734, which is communicatively connected to a second virtual circuit second transit node 736, which is communicatively connected to a second virtual circuit exit node 738, which is communicatively connected to the public communication network 780 via the NAT gateway 785. The application monitoring system 740 is communicatively connected to an auto scaling interface 745, for example, but not limited to, an AWS auto scaling interface, which is communicatively connected to an application programming interface (API) gateway 650, for example, but not limited to an Amazon API gateway. The API gateway 750 is communicatively connected to an auto-scaling system 755, for example, but not limited to, a TELOS GHOST application auto-scaling system. The auto-scaling system 755 is communicatively connected to a serverless, NoSQL database 760, for example, but not limited to, an Amazon DynamoDB, and the auto-scaling system 755 is also communicatively connected to a circuit provisioning engine 665, for example, but not limited to, a TELOS GHOST circuit provisioning engine, which is also communicatively connected to the serverless, NoSQL database 760 and an elastic compute cloud web service 770, for example, but not limited to, an Amazon Elastic Compute Cloud (EC2), which is communicatively connected to a dynamic firmware resource 775, for example, but not limited to an AMI dynamic firmware resource. The elastic compute cloud web service 770 is communicatively connected to the first virtual circuit 720 and the second virtual circuit 730.

In the network 700 of FIG. 7, a domain name system (DNS) web service 705, for example, but not limited to, Amazon Route 53, is communicatively connected to at least one client 710 that is in turn communicatively connected to a network load balancer 715, which monitors the level of communication requests received on the network 700 and the currently available resources. If the network application auto-scaling engine 755 detects from the access node 722, 732 that, based on one or more operating metrics of the virtual circuits 720, 730, the level of communication requests are too much for a number of available virtual circuits 720, 730, the application auto-scaling engine 755 sends a request to a provisioning engine 765, for example, but not limited to, a Circuit Provisioning Engine 765, for example, but not limited to, a TELOS GHOST circuit provisioning engine, which will either create new virtual circuits or destroy the available virtual circuits 720, 730. The one or more operating metrics can include, but are not limited to, a bandwidth, a compute utilization, a count of active users, a load average of the access node, memory utilization, disk drive activity, etc. The virtual circuits 720, 730 each include an access node 722, 732, one first transit node 724, 734, one second transit node 726, 736, and an exit node 728, 738. In the embodiment in FIG. 7, the access node 722 is communicatively connected to a first transit node 624, which is communicatively connected to a second transit node 726, which is communicatively connected to the exit node 728. A circuit provisioning engine 765 sends a request to an elastic compute cloud web service 770, for example, but not limited to, an Amazon Elastic Compute Cloud (EC2) either for additional virtual circuits 720, 730 or to take virtual circuits 720, 730 away. Then, based on the request, the elastic compute cloud web service 770, using a dynamic firmware resource 775, for example, but not limited to an AMI dynamic firmware resource either requests an additional virtual circuit 720, 730 or the removal of an existing virtual circuit 720, 730.

In these implementations, the network load balancer 715 provides an interface for clients, i.e., users, 710 to access the network 700 and the virtual circuits 720, 730, which are also called channels, can be deployed between available regions in the CSPs. A client 710 can connect using a VPN-based software, for example, but not limited to, OpenVPN, IP/Sec, or WIREGUARD to one of the access nodes attached to the load balancer and is authenticated using various methods (for example, SSL certificates, username/password, Pre- Shared Keys, etc.). Circuits can be destroyed on a configurable time-based setting and clients reauthenticate to another access node as needed when a circuit being used is destroyed, allowing for dynamic circuit configuration. All configuration information for the nodes is pushed when they are created. Capacity can be increased or decreased based upon usage metrics. Utilizing the CSP infrastructure allows only the network load balancer and the exit node to require public IP addresses. In the network 700, all exit nodes in a given location can be placed behind the NAT gateway 785, resulting in only the NAT gateway 785 requiring a public IP address for all traffic.

The use of WIREGUARD is significantly simpler than Tor in its implementation, configuration, and operation. Its installation can be as straightforward as a kernel module in the Linux kernel without any need for compilation of software (for example, the Tor clients and directory authority components). Its configuration requires what amounts to generation and distribution of paired ssh-style keys with port forwarding information. Its operation is inherent with the startup of the nodes. It operates at the network layer (that is, layer 3 of the OSI network model), thus reducing the amount of local network stack traversal required as the data passes through each node.

Figure 8:
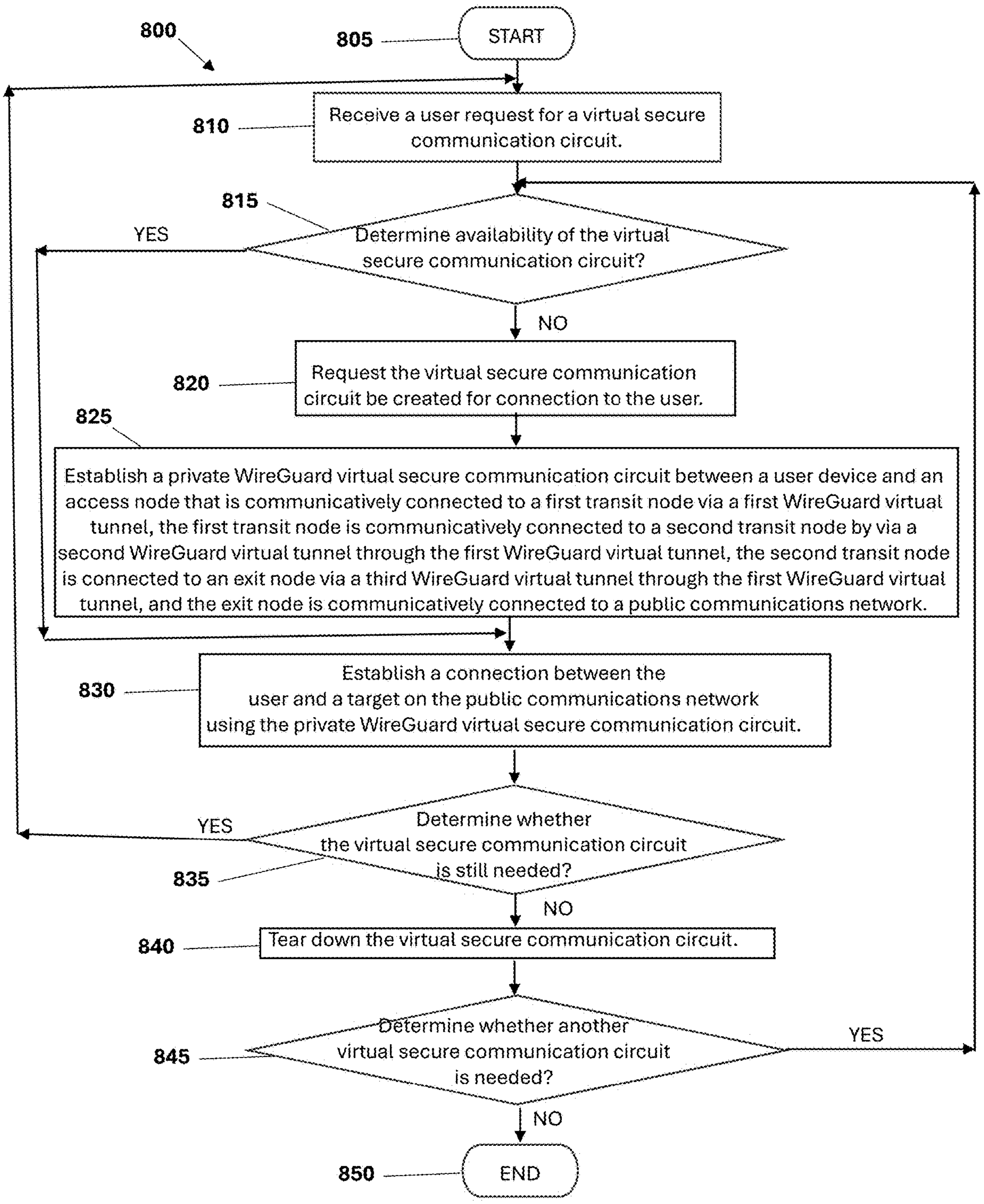
FIG. 8 is flowchart of a method of operation for a location obfuscation of network traffic system, in accordance with an embodiment of the presently disclosed subject matter.

FIG. 8 is a flowchart of a method of operation for a location obfuscation of network traffic system, in accordance with an embodiment of the presently disclosed subject matter. In FIG. 8, a method 800 starts 805 and receives 810 a user request for a virtual secure communication circuit. The method then determines 815 availability of the virtual secure communication circuit and, if it is not available, the method requests 820 the virtual secure communication circuit be set up for connection to the user. The method then establishes 825 a private WIREGUARD virtual secure communication circuit between a user device and an access node that is communicatively connected to a first transit node via a first WIREGUARD virtual tunnel, the first transit node is communicatively connected to a second transit node by via a second WIREGUARD virtual tunnel through the first WIREGUARD virtual tunnel, the second transit node is connected to an exit node via a third WIREGUARD virtual tunnel through the first WIREGUARD virtual tunnel, and the exit node is communicatively connected to a public communications network. Then, or if the method determined 815 the virtual secure communication circuit was available, the method establishes 830 a connection between the user and a target on the public communications network using the private WIREGUARD virtual secure communication circuit. The method then determines 835 whether the virtual secure communication circuit is still needed and, if it is still needed, loops back to receive 810 a new user request for a virtual secure communication circuit. If it is determined 835 that the virtual secure communication circuit is not needed, the method tears down 840 the virtual secure communication circuit. The method then determines 845 whether another virtual secure communication circuit is needed and, if one is still needed, loops back to again determine 815 the availability of the virtual secure communication circuit. If it is determined 845 that another virtual secure communication circuit is not needed, the method ends 850.

Figure 9:
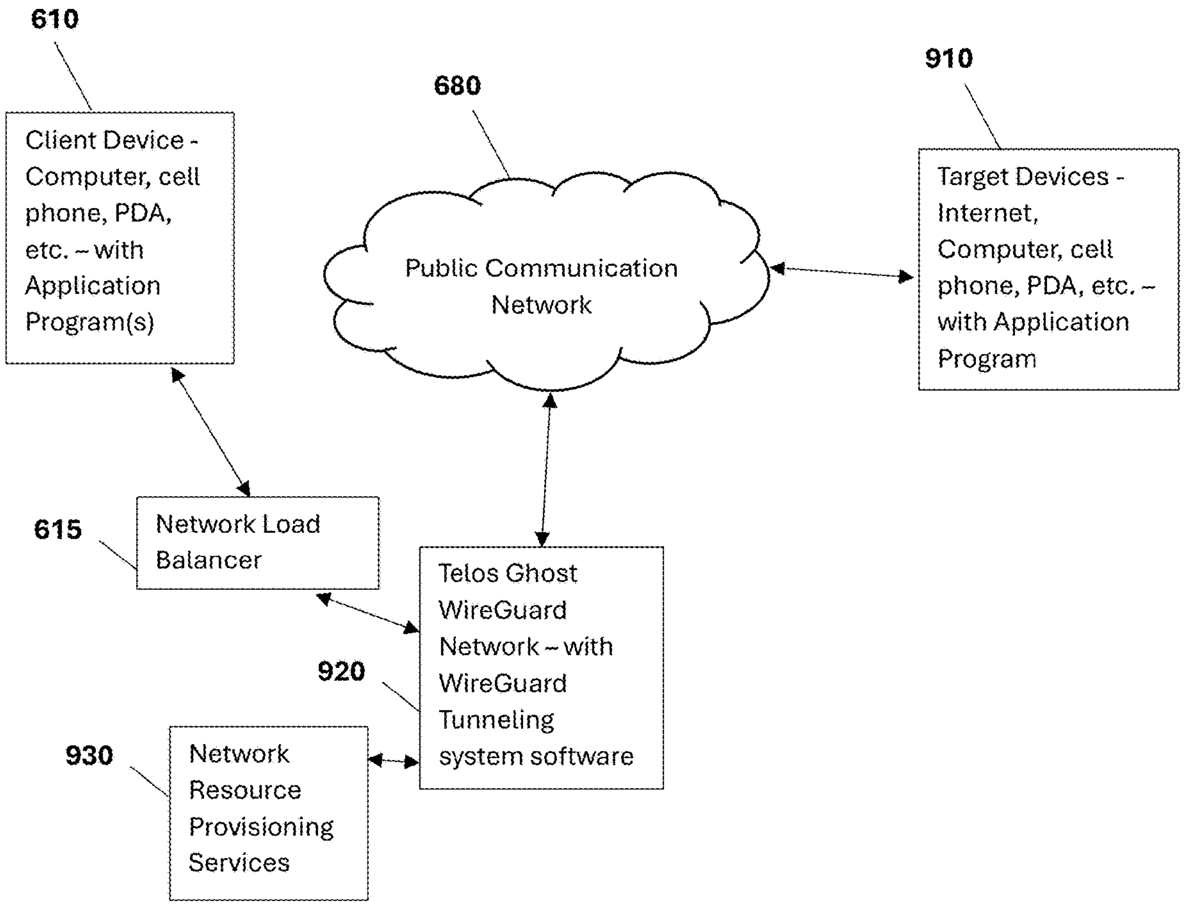
FIG. 9 is a system diagram of an overall system to implement and use embodiments of the presently disclosed subject matter.

FIG. 9 is a system diagram of an overall system in which to implement and use embodiments of the presently disclosed subject matter, for example, the system in FIG. 6. In FIG. 9, the at least one client device 610 can include, but are not limited to, personal computers, wearable computers, personal data assistants, cell phones, landline telephones, laptops, tablet computers, handheld gaming devices, and video game players. The network load balancer 615 can include, but is not limited to, an elastic load balancing service provided by AWS with, for example, 400 new UDP flows per second, 50,000 active UDP flows (sampled per minute), and 1 GB per hour for Amazon Elastic Compute Cloud (EC2) instances, containers, IP addresses, and Application Load Balancers as targets. The public communication network 680 can include the public internet. The TELOS GHOST WIREGUARD network 920 can include a circuit of the TELOS GHOST network with nested WIREGUARD tunneling system software as described herein. Network resource provisioning services 930 can include, but are not limited to, an Amazon CloudWatch service, an AWS auto scaling interface, an Amazon API gateway, a TELOS GHOST application auto-scaling system, an Amazon DynamoDB, a TELOS GHOST circuit provisioning engine, an Amazon Elastic Compute Cloud (EC2), and an AMI dynamic firmware resource. Like the at least one client device 610, the target devices 910 can include, but are not limited to, personal computers, wearable computers, personal data assistants, cell phones, landline telephones, laptops, tablet computers, handheld gaming devices, and video game players.

Figure 10:
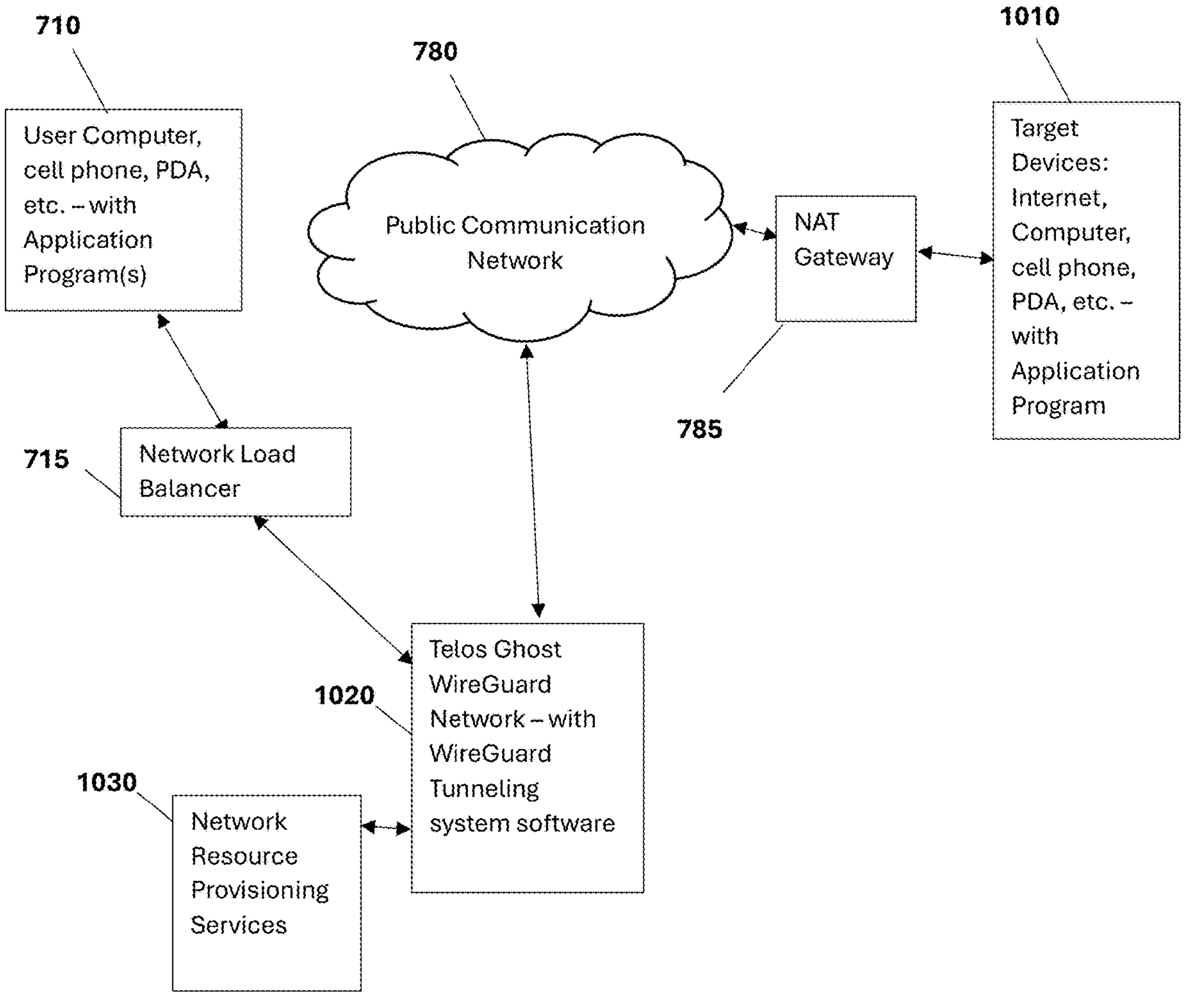
FIG. 10 is a system diagram of another overall system including the NAT gateway as shown and described herein in relation to FIG. 7 to implement and use embodiments of the presently disclosed subject matter.

FIG. 10 is a system diagram of another overall system including a NAT gateway as shown and described herein in relation to FIG. 7 to implement and use embodiments of the presently disclosed subject matter. In FIG. 10, which is basically identical to FIG. 9, except for the addition of the NAT gateway 785, the at least one client device 710 can include, but are not limited to, personal computers, wearable computers, personal data assistants, cell phones, landline telephones, laptops, tablet computers, handheld gaming devices, and video game players. The network load balancer 715 can include, but is not limited to, an elastic load balancing service provided by AWS with, for example, 400 new UDP flows per second, 50,000 active UDP flows (sampled per minute), and 1 GB per hour for Amazon Elastic Compute Cloud (EC2) instances, containers, IP addresses, and Application Load Balancers as targets. The public communication network 780 can include the public internet. The TELOS GHOST WIREGUARD network 1020 can include a circuit of the TELOS GHOST network with nested WIREGUARD tunneling system software as described herein. Network resource provisioning services 1030 can include, but are not limited to, an Amazon CloudWatch service, an AWS auto scaling interface, an Amazon API gateway, a TELOS GHOST application auto-scaling system, an Amazon DynamoDB, a TELOS GHOST circuit provisioning engine, an Amazon Elastic Compute Cloud (EC2), and an AMI dynamic firmware resource. Like the at least one client device 710, the target devices 1010 can include, but are not limited to, personal computers, wearable computers, personal data assistants, cell phones, landline telephones, laptops, tablet computers, handheld gaming devices, and video game players. The NAT gateway can be created and configured using the Amazon VPC console.

Figure 11:
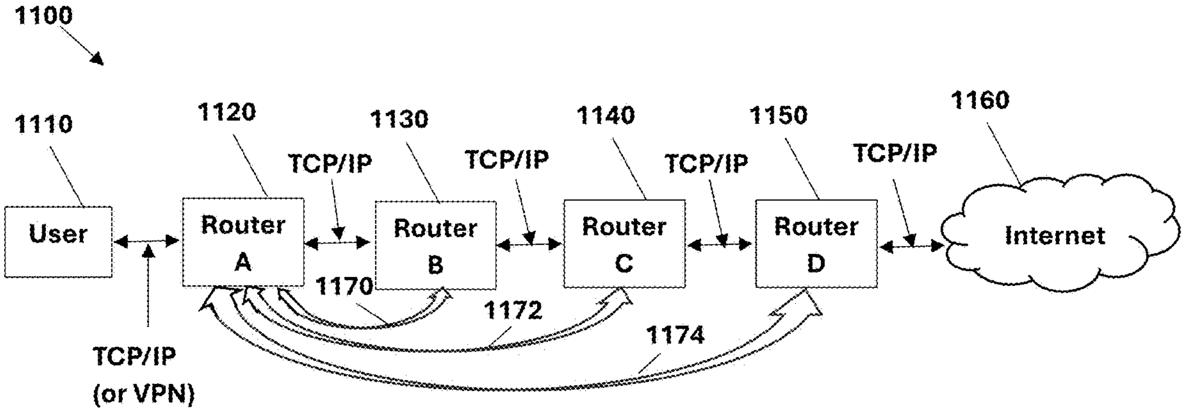
FIG. 11 is a system diagram showing a WIREGUARD protocol implementation using virtual tunnel interfaces for location obfuscation for network traffic, in accordance with another embodiment of the presently disclosed subject matter.

FIG. 11 is a system diagram showing a WIREGUARD protocol implementation using virtual tunnel interfaces for location obfuscation for network traffic, in accordance with another embodiment of the presently disclosed subject matter. In a configuration similar to FIG. 5, as shown in FIG. 11, a client device 1110 can securely and anonymously connect to the Internet 1160 through four routers, i.e., nodes, router A—access 1120, routers B & C—transits 1130, 1140, and router D—exit 1150 over three nested virtual tunnel interfaces. As seen in FIG. 11, a first virtual tunnel interface 1170 is created between router A 1120 and router B 1130, over which a second virtual tunnel interface 1172 is created between router A 1120 and router C 1140, over which a third virtual tunnel interface 1174 is created between router A 1120 and router D 1150. As with the EC2 virtual machine configurations, the tunnels go over the previous tunnel with consecutive port numbers to maintain single-hop knowledge, that is, each router only knows the before and after routers.

The interface establishes IP addresses of the virtual tunnel interfaces using: "ciscoasa(config-if)#ip address 192.168.1.10 255.255.255.254". In addition, the existing "tunnel destination" configuration option is: "ciscoasa(config-if)#tunnel destination 10.1.1.1", which can possibly be extended to take a port number using: "ciscoasa(config-if) #tunnel destination 10.1.1.1 51821".

While this implements a static, enterprise-level sort of nested WIREGUARD tunnel configuration, since the virtual tunnel interface configurations are manual, an automated system for management of these devices is also contemplated.

In another embodiment of the presently disclosed subject matter, a public WIREGUARD onion routing (WOR) Network mimics the existing public Tor network architecture with corresponding replacement of circuit configuration information and components to use the WIREGUARD equivalent. Specifically, there would be: 1) directory authority nodes; 2) guard (or access) nodes; 3) relay (or transit) nodes; 4) exit nodes; and beyond the traditional obfuscated (primarily web) traffic of the actual network: 5) hidden (or cloaked) services. In this embodiment, all nodes can appear anywhere on the public internet, with the only requirement being a static public IP address (not a dynamic or ephemeral IP address) and ability to route traffic for the desired range of port numbers. The architecture described below is for a distributed dynamic network, but it can also be implemented in a static configuration as well. Except for the directory authority nodes, for which a mechanism for publication of the IP addresses is needed, all other nodes can be added/removed dynamically from the network.

Nodes, other than the directory authority nodes, can operate in any of the roles (access, transit, or exit), including simultaneously as multiple roles, but are described below with the characteristics specific to the individual types of nodes for each function.

In this embodiment, the directory authority nodes provide the same functionality as in Tor and have been described as "dedicated servers which tell Tor clients which relays make up the Tor network. Information about these directory authorities, located around the world and maintained by super trusted we-know-you-and-have-had-many-beers-with-you TOR volunteers, are hard-coded into Tor." (source: https://blog.torproject.org/introducing-bastet-our-new-directory-authority/.)

The differences being that the information exchanged between the nodes and the directory authority nodes use WIREGUARD connections (e.g., peer public key(s), IP addresses and ranges of port numbers for iptables forwarding rules, etc.) in addition to any similar bandwidth or probationary period information used to determine when a node is sufficiently "trusted" to be allowed to pass "production" traffic, as with current Tor protocol.

The directory authority nodes use consensus voting (again as similarly performed in the Tor network) to determine available nodes for circuit creation, respond to circuit requests (from guard, or access nodes) transmitting the circuit configuration information to the individual nodes in the resulting circuit. Similar capabilities and alarms for managing the quantity of nodes in the network using reported metrics mentioned above (user count, bandwidth, etc.) can be implemented to allow for dynamic capacity configuration.

Within the public Tor network, nodes can identify what roles they are willing to perform. A guard, or access node, can provide the interface for a client to connect to the network. A list of available access nodes can be requested from the directory authority nodes.

In Tor, this functionality is performed by client software running in a Tor browser on the client device; in TELOS GHOST it is accomplished by client VPN software (e.g., OpenVPN, StrongSwan, WIREGUARD) running on the client device and connecting to a corresponding server running on the access node. Both OpenVPN and StrongSwan (IP/sec) allow for dynamic IP address allocation (using DHCP) and anonymous connectivity and can be used for this capability. The servers on the access node can be configured to send a circuit request to the directory access nodes upon connection and establish the corresponding circuit by configuring the resulting WIREGUARD tunnel endpoints with the returned configuration information.

DNS routing can be used to ensure that the DNS requests are routed to the exit node or any required internal DNS servers that might respond to identify the internal location of hidden or cloaked services. The client VPN software has a capability for receiving pushed DNS lookup information from the server upon connection.

Relay nodes can publish availability and capabilities to directory authority nodes and receive circuit configuration and destruction information in return. Rules for iptables are also provided based upon their location within a specific circuit.

Exit nodes also publish availability and capabilities to directory authority nodes and receive circuit configuration and destruction information in return. Additionally, the exit nodes operate a forwarding DNS server to respond to requests from the access nodes to prevent DNS request leaks at the access nodes.

Hidden (or cloaked) services are servers that are configured to only be available within the WIREGUARD onion routing network when users are connected to an access node. An internal DNS, routing information, and any necessary firewalls/security groups, can be configured to allow connectivity to these servers from within the defined network only.

In an embodiment of the disclosed subject matter, a system including: a network layer peer-to-peer protocol implemented directly in an operating system kernel in a processor and configured to create a virtual circuit to anonymously route network traffic through the virtual circuit. The virtual circuit includes: an access node communicatively connected and configured to receive and send requests to create the virtual circuit; a plurality of transit nodes including: a first transit node communicatively connected to the access node via a first secure virtual private network (VPN) tunnel; a second transit node communicatively connected to the access node via a second secure VPN tunnel where the second secure VPN tunnel is configured to route the network traffic through the first VPN tunnel, and an exit node communicatively connected to the access node via a third secure VPN tunnel where the third secure VPN tunnel is configured to route the network traffic through the second VPN tunnel and the first VPN tunnel, where the access node, each of the plurality of transit nodes, and the exit node each know only a previous node and a following node in the virtual circuit using port forwarding rules at the network layer.

In an embodiment of the disclosed subject matter, an obfuscated persona management system including: a network load balancer communicatively connected to a network and the network load balancer being configured to automatically connect to at least one virtual circuit on the network in response to a request to connect and each at least one virtual circuit with a plurality of nodes including an access node, a first transit node communicatively connected to the access node, a second transit node communicatively connected to the first transit node, and an exit node communicatively connected to the second transit node. The obfuscated persona management system further including: an auto-scaling component communicatively connected to the at least one virtual circuit and configured to monitor a level of network usage and request a change in a number of virtual circuits in the at least one virtual circuit; a provisioning engine communicatively connected to the auto-scaling component and the load balancer and configured to effect the change in the number of virtual circuits in the at least one virtual circuit; at least one computing unit including a bus communicatively connected to each of a processor, a random-access memory, a long-term memory, and a communication unit communicatively connect to the network; and a network layer peer-to-peer protocol implemented as executable software code directly in an operating system kernel in the at least one computing unit, where, when executed by the processor, creates the at least one virtual circuit to anonymously route network traffic across the at least one virtual circuit using a plurality of nested virtual private network tunnels at the network layer.

In an embodiment of the disclosed subject matter, a computer-implemented method of enabling a location obfuscation of network traffic system, the method including: receiving, by a computing device, a request for a virtual secure communication circuit; and determining, by the computing device, availability of the virtual secure communication circuit. If the virtual secure communication circuit is not available, setting up, by the computing device, the virtual secure communication circuit as a private wireguard virtual secure communication circuit including an access node communicatively connected to a first transit node via a first virtual tunnel, the first transit node communicatively connected to a second transit node via a second virtual tunnel through the first virtual tunnel, the second transit node communicatively connected to an exit node via a third virtual tunnel through the first virtual tunnel, and the exit node communicatively connected to a public communications network; and if the virtual secure communication circuit is available, establishing a communication connection over the virtual secure communication circuit between a user device and a target device connected to the public communications network.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A system comprising:

at least one computing unit including a bus communicatively connected to each of a processor, a random-access memory, a long-term memory, and a communication unit communicatively connect a network a network layer peer-to-peer protocol implemented as executable software code directly in an operating system kernel in the random-access memory in the processor and configured, when executed by the processor, to create a virtual circuit to anonymously route network traffic through the virtual circuit at a network layer of the operating system kernel, the virtual circuit comprising:

an access node communicatively connected and configured to receive and send requests to create the virtual circuit via the processor at the network layer of the operating system kernel; and a plurality of transit nodes including:

a first transit node communicatively connected to the access node at the network layer of the operating system kernel via a first secure virtual private network (VPN) tunnel;

a second transit node communicatively connected to the access node at the network layer of the operating system kernel via a second secure VPN tunnel where the second secure VPN tunnel is configured to route the network traffic through the first VPN tunnel, and an exit node communicatively connected to the access node at the network layer of the operating system kernel via a third secure VPN tunnel where the third secure VPN tunnel is configured to route the network traffic through the second VPN tunnel and the first VPN tunnel, where the access node, each of the plurality of transit nodes, and the exit node each know only a previous node and a following node in the virtual circuit using port forwarding rules at the network layer of the operating system kernel.

2. The system of claim 1, wherein the operating system kernel is a Linux kernel.

3. The system of claim 1, wherein each of the first secure VPN tunnel, the second secure VPN tunnel, and the third secure VPN tunnel operate at the operating system kernel level configured in a nested configuration.

4. The system of claim 3, wherein each node in the virtual circuit knows only the previous and following nodes in the virtual circuit using port forwarding rules at the network layer.

5. The system of claim 1, wherein a client device is communicatively connected to the access node and a target device is communicatively connected to the exit node and both are located outside of the virtual circuit, and each have a unique IP address.

6. The system of claim 5, wherein the exit node is further configured to receive and send messages over the virtual circuit between the client device and the target device.

7. The system of claim 6, wherein the virtual circuit comprises a VPN between the client device and the access node.

8. The system of claim 1, wherein the first transit node is communicatively connected to the access node at the network layer of the operating system kernel via a first secure virtual private network (VPN) tunnel further comprises:

the first transit node is communicatively connected to the access node via the first secure VPN tunnel over a public IP address of the first transit node.

9. The system of claim 8, wherein the second transit node is communicatively connected to the access node at the network laver of the operating system kernel via a second secure VPN tunnel where the second secure VPN tunnel is configured to route traffic through the first VPN tunnel further comprises:

the second transit node is communicatively connected to the access node via the second secure VPN tunnel through the first VPN tunnel to the public IP address of the second transit node.

10. The system of claim 9, wherein the exit node is communicatively connected to the access node at the network layer of the operating system kernel via a third secure VPN tunnel where the third secure VPN tunnel is configured to route traffic through the second VPN tunnel and the first VPN tunnel further comprises:

the exit node is communicatively connected to the access node at the network laver of the operating system kernel via the second secure VPN tunnel through the second VPN tunnel and the first VPN tunnel to the public IP address of the exit node.

11. The system of claim 1, wherein each of the first secure VPN tunnel, the second secure VPN tunnel, and the third secure VPN tunnel comprises:

a secure wireguard VPN tunnel.

12. The system of claim 1, further comprising an obfuscated persona management system comprising:

a network load balancer communicatively connected to the network and the network load balancer being configured to automatically connect to an at least one virtual circuit on the network in response to a request to connect and the at least one virtual circuit with a plurality of nodes including the access node, the first transit node communicatively connected to the access node, the second transit node communicatively connected to the first transit node, and the exit node communicatively connected to the second transit node;

an auto-scaling component communicatively connected to the at least one virtual circuit and configured to monitor a level of network usage and request a change in a number of virtual circuits in the at least one virtual circuit;

a provisioning engine communicatively connected to the auto-scaling component and the load balancer and configured to effect the change in the number of virtual circuits in the at least one virtual circuit;

at least one computing unit including a bus communicatively connected to each of a processor, a random-access memory, a long-term memory, and a communication unit communicatively connect to the network; and the network layer peer-to-peer protocol implemented as executable software code directly in an operating system kernel in the at least one computing unit, where, when executed by the processor, creates the at least one virtual circuit to anonymously route network traffic across the at least one virtual circuit using a plurality of nested virtual private network tunnels at a network layer.

13. The obfuscated persona management system of claim 12 wherein the access node is communicatively connected to a client node.

14. The obfuscated persona management system of claim 13 wherein the exit node is communicatively connected to a target node.

15. The obfuscated persona management system of claim 14 further comprises:

a network address translation (NAT) gateway communicatively connected between the exit node and the target node.

16. The obfuscated persona management system of claim 12 wherein the plurality of nested virtual private network tunnels comprises:

a first secure virtual private network (VPN) tunnel communicatively connected between the access node and the first transit node, a second secure VPN tunnel communicatively connected between the access node and the second transit node, where the second secure VPN tunnel is configured to route the network traffic through the first secure VPN tunnel, and a third secure VPN tunnel communicatively connected between the access node and the exit node, where the third secure VPN tunnel is configured to route the network traffic through the second secure VPN tunnel and the first VPN tunnel, where the access node, the first transit node, the second transit node, and the exit node each know only a previous node and a following node in the at least one virtual circuit using port forwarding rules at the network layer.

17. The obfuscated persona management system of claim 16 further comprises:

a network address translation (NAT) gateway communicatively connected between the exit node and a target node.

18. The obfuscated persona management system of claim 17, wherein the NAT gateway has a public IP address and is located outside of the plurality of nested virtual private network tunnels communicatively.

19. The system of claim 1 wherein the network layer peer-to-peer protocol comprises:

a computer-implemented method of enabling a location obfuscation of network traffic system, the method comprising:

receiving, by the processor, a request for a virtual secure communication circuit;

determining, by the processor, availability of the virtual secure communication circuit;

if the virtual secure communication circuit is not available, setting up, by the processor, the virtual secure communication circuit as a private wireguard virtual secure communication circuit including the access node communicatively connected to the first transit node via a first virtual tunnel, the first transit node communicatively connected to the second transit node via a second virtual tunnel through the first virtual tunnel, the second transit node communicatively connected to the exit node via a third virtual tunnel through the first virtual tunnel, and the exit node communicatively connected to a public communications network; and if the virtual secure communication circuit is available, establishing a communication connection over the virtual secure communication circuit between a user device and a target device connected to the public communications network.

20. The system of claim 19 further comprising:

determining, by the processor, whether the virtual secure communication circuit is still needed; and if it is determined that the virtual secure communication circuit is not needed tearing down, by the processor, the virtual secure communication circuit.

21. The system of claim 11, wherein each of the first secure VPN tunnel, the second secure VPN tunnel, and the third secure VPN tunnel comprises:

a third secure wireguard VPN tunnel being nested within a second secure wireguard VPN tunnel, the second secure wireguard VPN tunnel and the third secure wireguard VPN tunnel being nested within a first secure wireguard VPN tunnel.

* * * * *